US012657069B2

(12) United States Patent
Shveidel et al.

(10) Patent No.: US 12,657,069 B2
(45) Date of Patent: Jun. 16, 2026

(54) TECHNIQUES FOR EFFICIENT FLUSHING AND PROVIDING OPTIMAL RESOURCE UTILIZATION

(71) Applicant: Dell Products L.P., Hopkinton, MA (US)

(72) Inventors: Vladimir Shveidel, Pardes-Hana (IL); Geng Han, Beijing (CN); Jibing Dong, Beijing (CN)

(73) Assignee: Dell Products L.P., Hopkinton, MA (US)

( * ) Notice: Subject to any disclaimer, the term of this patent is extended or adjusted under 35 U.S.C. 154(b) by 791 days.

(21) Appl. No.: 17/964,298

(22) Filed: Oct. 12, 2022

(65) Prior Publication Data

US 2024/0134712 A1      Apr. 25, 2024

(51) Int. Cl.
*G06F 9/50*        (2006.01)
*G06F 3/06*        (2006.01)

(52) U.S. Cl.
CPC .......... *G06F 9/5077* (2013.01); *G06F 3/0608* (2013.01); *G06F 3/0664* (2013.01); *G06F 3/0673* (2013.01)

(58) Field of Classification Search
CPC .... G06F 9/5077; G06F 3/0608; G06F 3/0664; G06F 3/0673
See application file for complete search history.

(56) References Cited

U.S. PATENT DOCUMENTS

| | | | | | |
|---|---|---|---|---|---|
| 6,016,553 | A | * | 1/2000 | Schneider | ........... G06F 11/1451 |
| | | | | | 714/21 |
| 10,452,616 | B1 | * | 10/2019 | Bassov | .................. G06F 3/064 |
| 2004/0225649 | A1 | * | 11/2004 | Yeo | ......................... G06Q 10/10 |
| 2007/0288568 | A1 | * | 12/2007 | Hayter | .................... G06F 9/546 |
| | | | | | 709/204 |
| 2014/0046906 | A1 | * | 2/2014 | Patiejunas | ........... G06F 21/6209 |
| | | | | | 707/661 |

OTHER PUBLICATIONS

U.S. Appl. No. 17/237,853, filed Apr. 22, 2021, entitled System and Method for Efficient Snapshots Barrier Mechanism for System With Presorted Container-Based Log, to Vladimir Shveidel, et al.

* cited by examiner

*Primary Examiner* — April Y Blair

(74) *Attorney, Agent, or Firm* — BainwoodHuang

(57) ABSTRACT

In at least one embodiment, processing can include: receiving virtual utilizations (VUs) for resources consumed in connection with recording entries in a log for commands or operations, wherein each resource has a corresponding VU which denotes a number of allocated units of the resource associated with entries of the log which have not been flushed from the log; determining a first resource having a maximum VU with respect to VUs of consumed resources; determining whether the maximum VU is within an acceptable VU range, wherein the acceptable VU range has bounds determined in accordance with a maximum deviation threshold associated with the first resource; and responsive to determining the maximum VU is not within the acceptable VU range of the first resource, performing one of a plurality of regulation actions that varies an amount of a system resource to accordingly vary a flush rate of entries from the log.

20 Claims, 16 Drawing Sheets

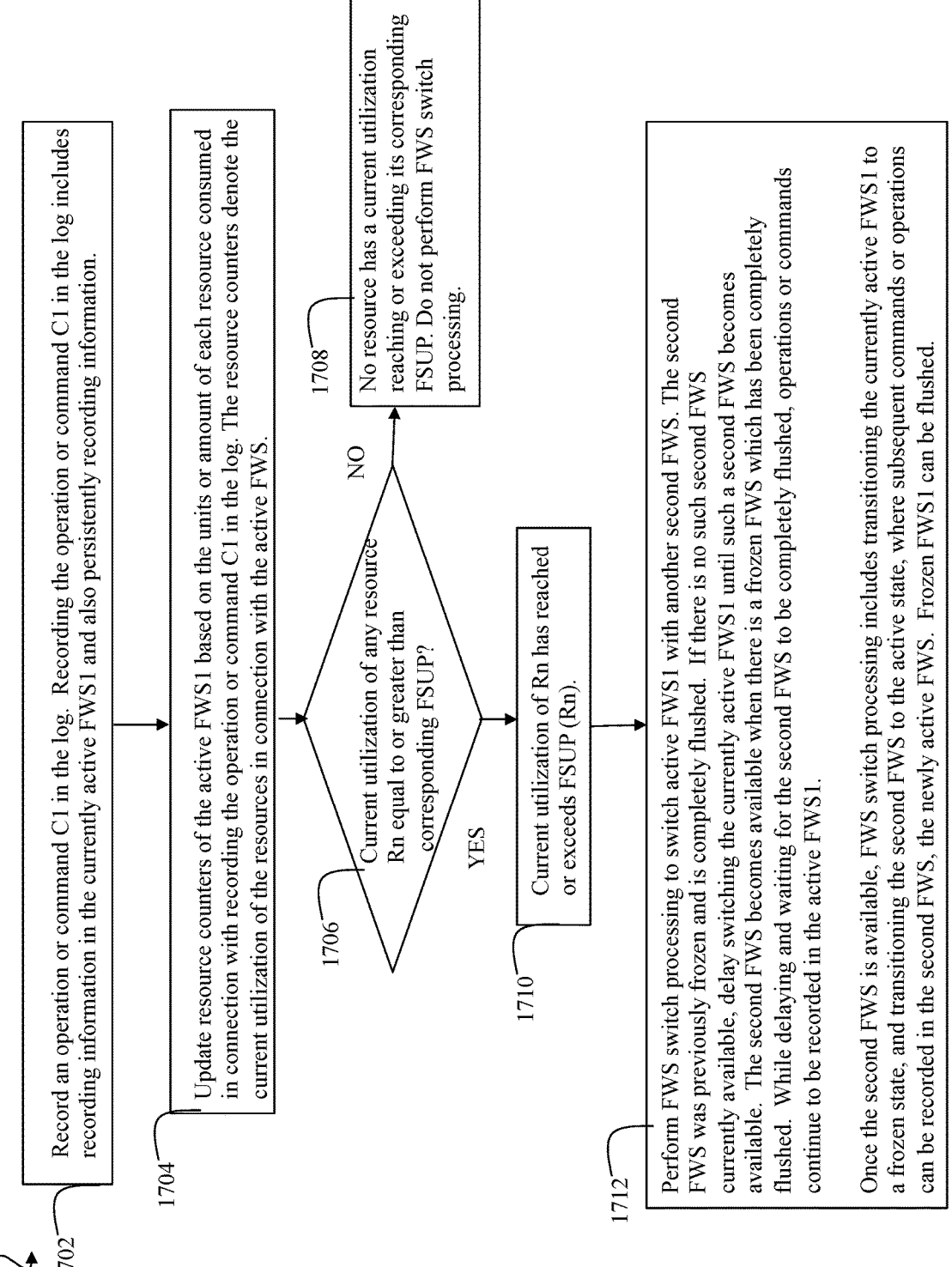

1700

1702 — Record an operation or command C1 in the log. Recording the operation or command C1 in the log includes recording information in the currently active FWS1 and also persistently recording information.

1704 — Update resource counters of the active FWS1 based on the units or amount of each resource consumed in connection with recording the operation or command C1 in the log. The resource counters denote the current utilization of the resources in connection with the active FWS.

1706 — Current utilization of any resource Rn equal to or greater than corresponding FSUP?

NO

1708 — No resource has a current utilization reaching or exceeding its corresponding FSUP. Do not perform FWS switch processing.

YES

1710 — Current utilization of Rn has reached or exceeds FSUP (Rn).

1712 — Perform FWS switch processing to switch active FWS1 with another second FWS. The second FWS was previously frozen and is completely flushed. If there is no such second FWS currently available, delay switching the currently active FWS1 until such a second FWS becomes available. The second FWS becomes available when there is a frozen FWS which has been completely flushed. While delaying and waiting for the second FWS to be completely flushed, operations or commands continue to be recorded in the active FWS1.

Once the second FWS is available, FWS switch processing includes transitioning the currently active FWS1 to a frozen state, and transitioning the second FWS to the active state, where subsequent commands or operations can be recorded in the second FWS, the newly active FWS. Frozen FWS1 can be flushed.

FIG. 16

TECHNIQUES FOR EFFICIENT FLUSHING AND PROVIDING OPTIMAL RESOURCE UTILIZATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: receiving a plurality of virtual utilizations (VUs) for a plurality of resources consumed in connection with recording entries in a log for commands or operations, wherein each of the plurality of resources has a corresponding VU of the plurality of VUs denoting the VU for said each resource, wherein said corresponding VU denotes a number of allocated units of said each resource which are associated with one or more entries of the log, and wherein the one or more entries have not been flushed from the log; determining a first of the plurality of resources having a maximum VU of the plurality of VUs; determining whether the maximum VU is within an acceptable VU range, wherein the acceptable VU range has a lower bound (LB) and an upper bound (UB) determined in accordance with a maximum deviation threshold associated with the first resource; and responsive to determining the maximum VU is not within the acceptable VU range of the first resource, performing one of a plurality of regulation actions that varies an amount of a system resource to accordingly vary a flush rate of entries from the log.

In at least one embodiment, responsive to determining the maximum VU is not within the acceptable VU range of the first resource, first processing can be performed. The first processing can include: determining whether the maximum VU is included in the first VU range of values each exceeding the UB of the acceptable VU range; and responsive to determining the maximum VU is included in the first range of VU values each exceeding the UB of the acceptable VU range, performing a first regulation action, which is expected to increase the flush rate of entries from the log, as the one regulation action. The first processing can include: determining whether the maximum VU is included in a second VU range of values each less than the LB of the acceptable VU range; and responsive to determining the maximum VU is included in the second range of VU values each less than the LB of the acceptable VU range, performing a second regulation action, which is expected to decrease the flush rate of entries from the log, as the one regulation. The first regulation action can increase the system resource by a first amount. The second regulation action can decrease the system resource by a first amount. The system resource can be a processor resource. The regulation action can include varying a number of processing cores dedicated to performing processing to flush entries from the log.

In at least one embodiment, the plurality of resources can include page descriptors (PDESCs) and page blocks (PBs). Each PDESC allocated for use in recording a first command or operation in the log can describe the first command or operation. Each of the PBs allocated for use in recording the first command or operation can store data written by the first command or operation, and wherein said each PB can be associated with a corresponding allocated PDESC describing the first command or operation. The plurality of resources consumed in connection with recording commands or operations in the log can include first structures stored in non-volatile storage, and can include second structures stored in volatile storage.

In at least one embodiment, processing can include recording a first operation or command in the log, wherein said recording includes recording a first entry regarding the first operation or command in a flush working set (FWS) of entries on volatile storage and persistently recording information, including a corresponding entry regarding the first operation or command, in one or more structures on non-volatile storage. Processing can include updating a plurality of resource counters of the FWS based on an amount of each of the plurality of resources consumed in connection with recording the first operation or command in the log, wherein the plurality of resource counters can denote current utilizations of the plurality of resources for the FWS. Processing can include receiving a plurality of FWS switch utilization points (FSUPs) for the plurality of resources, wherein each of the plurality of resources can have a corresponding one of the plurality of FSUPs denoting the FWS switch point for said each resource. Processing can include: determining, in accordance with the plurality of resource counters and the plurality of FSUPs, whether a current utilization of a first of the plurality of resources is equal to or greater than the corresponding one of the plurality of FSUPs associated with said first resource; and responsive to determining the current utilization of the first resource is equal to or greater than the corresponding FSUP associated with the first resource, performing first processing to switch the FWS with a second FWS, wherein said first processing transitions the FWS from an active state to a frozen state, and transitions the second FWS from an idle state to an active state, wherein the idle state indicates that the second FWS was previously frozen and all flushing is complete for all recorded entries in the second FWS. Processing can include: determining the second FWS is not yet available wherein the second FWS is frozen but has not yet been completely flushed; and responsive to determining the second FWS is not yet available, waiting until the second FWS is available with flushing complete for all entries of the second FWS. During said waiting, received commands or operations can be recorded in the FWS.

In at least one embodiment, the commands or operations recorded in the log can include a write I/O operation that writes content to a target logical address and can include an offload copy operation.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 15 and 16 are flowcharts of processing steps performed in at least one embodiment in accordance with the techniques of the present disclosure.

DETAILED DESCRIPTION OF EMBODIMENT(S)

Figure 1:
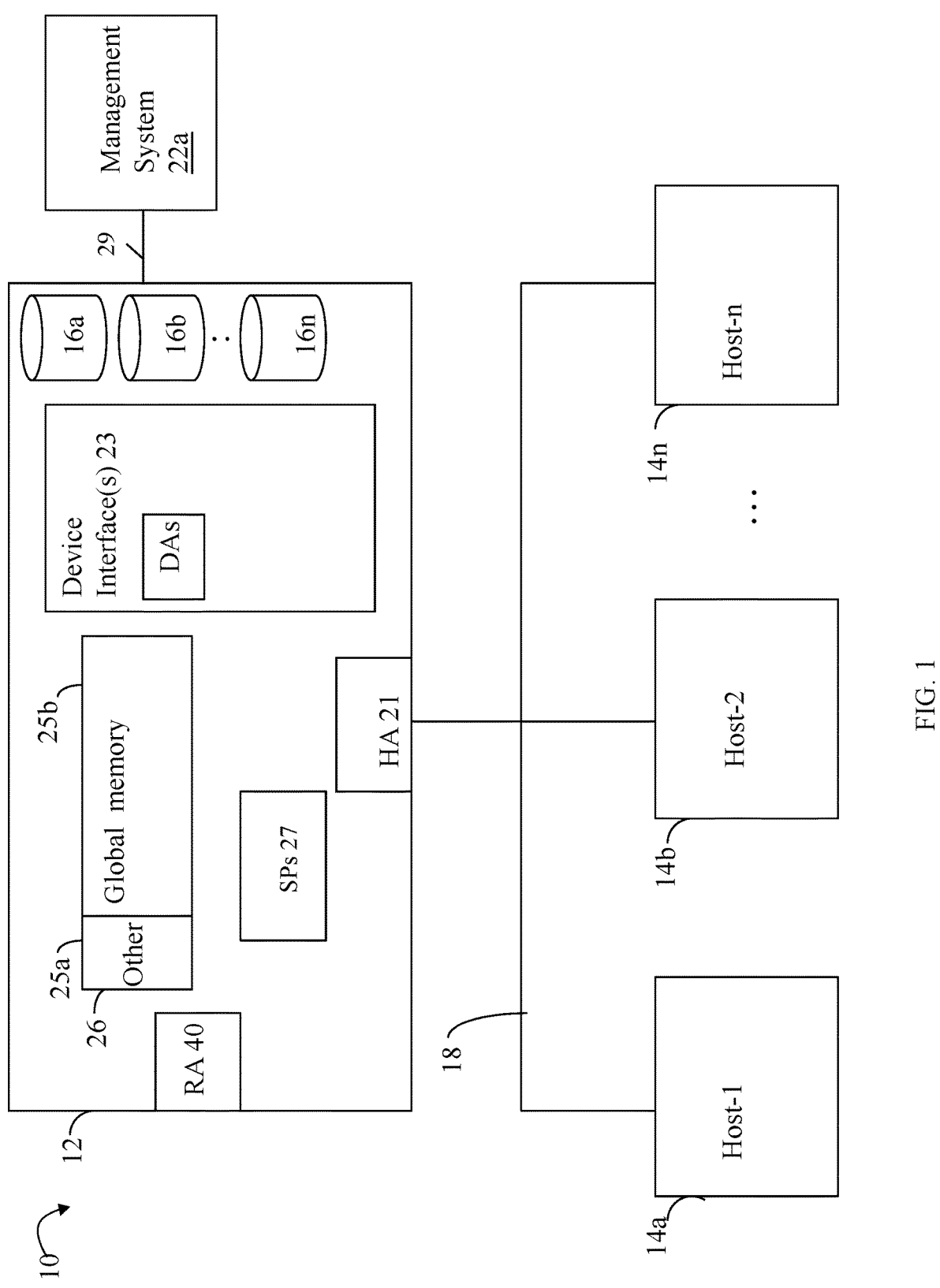
FIG. 1 is an example of components of at least one embodiment of system in accordance with the techniques of the present disclosure.

A system such as a data storage system can be a log-based system where writes, as well as possibly other operations or commands, can be persistently stored in a log. Use of the log to record writes and possibly other operations provides for improved write latency and thus improved performance of the data storage system. Once the write or other operation is recorded and persistently stored in the log, an acknowledgement regarding completion of the recorded operation can be sent to the originator of the write or other operation. The system can include multiple processing nodes which receive operations, such as the write operations recorded in the log. At a later point in time, entries of the log can be flushed and data written by the logged writes can be further persisted to back-end (BE) or long-term persistent storage. Once entries or records of the log have been flushed, resources associated with the flushed log entries can be reclaimed for reuse. For example, the persistent storage of the flushed log entries can be reclaimed for reuse in connection with persistently recording new write I/Os in the log.

To provide efficient flushing of the log (sometimes also referred to as the user data log or data log) and also efficient optimization of resources is generally a non-trivial task. For example, existing techniques may not provide smoothness and stability in connection with the flush processing rate. Existing techniques may not provide proper reclamation rates of resources used with logged entries. For example, resources may not be reclaimed for reuse at a sufficiently high rate thereby resulting in a resource shortage for recording new entries in the log. Additionally, reclamation of resources too early with too high a flush rate may reduce the risk of resource shortages but can result in inefficient data amortization and/or inefficient resource utilization. Furthermore, determining a desirable reclamation rate can vary with I/O workload.

Accordingly, described in the following paragraphs are techniques that overcome the foregoing drawbacks. The techniques of the present disclosure provide for efficient, reliable and adaptive regulation of flushing of the log. The techniques of the present disclosure provide for balancing and adapting the flush rate to reduce and/or eliminate resource shortages while also providing for improved optimal resource utilization. The techniques of the present disclosure provide for varying or adjusting the reclamation rate with I/O workload.

In at least one embodiment, a target utilization point or TUP can be determined for each individual resource that is consumed or used in connection with recording an entry in the log for an operation or command. The TUP for a particular resource can be expressed as a percentage denoting a difference between 100% and an adaptation reserve or AR. The AR for a corresponding resource denotes an amount of the resource reserved for use or consumption when adapting to workload changes in order to provide sustainability. For a regulation cycle, current virtual utilizations or VUs can be determined for the resources. The resource Rmax having the highest VUmax of all resources is determined. The amount of deviation of VUmax from the TUP corresponding to Rmax can be determined. If the deviation amount is more than a specified threshold, a regulation action can be performed. If the deviation amount indicates that VUmax is more than the TUP, the regulation action can increase the flush rate. If the deviation amount indicates that VUmax is less than the TUP, the regulation action can decrease the flush rate. The regulation action can include varying, such as by increasing or decreasing, a system resource affecting the flush rate of the log. The regulation action can include, for example, varying the number of processing cores or amount of CPU resources dedicated for flushing (e.g., used by the flush workflow processing).

In at least one embodiment, a flush working set (FWS) switch utilization point (FSUP) can be defined for each resource. Multiple FWSs can generally be used in an embodiment in connection with recording information about logged entries in volatile memory. In at least one embodiment, 3 FWSs can be used. One of the FWSs can be designated as active for recording information for logged operations or commands. The remaining FWSs can be frozen where entries of frozen FWS are flushed until empty. The currently active FWS can be switched or swapped with a frozen FWS which has been completely flushed responsive to determining that, for the currently active FWS, the current utilization of at least one resource exceeds its corresponding FSUP. Switching the currently active FWS includes transitioning the currently active FWS from active to frozen so that the FWS can be flushed. Switching can also include transitioning a second FWS, which is frozen and has been completely flushed, to active.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 can be connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, also be located in different physical locations. The communication medium 18 used for communication between the host systems 14a-14n and the data storage system 12 of the system 10 can use a variety of different communication protocols such as block-based protocols (e.g., SCSI, Fibre Channel, iSCSI), file system-based protocols (e.g., NFS or network file server), and the like.

Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques of the present disclosure. It should also be noted that an embodiment can include data storage arrays or other components from one or more vendors.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs can refer to solid state electronics devices as distinguished from electromechanical devices, such as hard drives, having moving parts. Flash devices or flash memory-based SSDs are one type of SSD that contains no moving mechanical parts. The flash devices can be constructed, for example, using nonvolatile semiconductor NAND flash memory.

The data storage system can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage system can include one or more RAs used, for example, to facilitate communications between data storage systems. The data storage system can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage system. In one embodiment, the device interfaces 23 can perform data operations using a system cache that can be included in the global memory 25b, for example, when communicating with other device interfaces and other components of the data storage system. The other portion 25a is that portion of the memory that can be used in connection with other designations that vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 can also provide data to the host systems 14a-n also through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as volumes or logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage referenced by such logical unit numbers. The LUNs may or may not correspond to the actual or physical disk drives or more generally physical storage devices. For example, one or more LUNs can reside on a single physical disk drive, data of a single LUN can reside on multiple different physical devices, and the like. Data in a single data storage system can be accessed by multiple hosts allowing the hosts to share the data residing therein. The HAs can be used in connection with communications between a data storage system and a host system. The RAs can be used in facilitating communications between two data storage systems. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques of the present disclosure, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques of the present disclosure can be be made with respect to a physical data storage system and its physical components (e.g., physical hardware for each HA, DA, HA port and the like), the techniques of the present disclosure can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a can be a computer system which includes data storage system management software or application executing in a web browser. A data storage system manager can, for example, view information about a current data storage configuration such as LUNs, groups of LUNs, and the like, on a user interface (UI) in a display device of the management system 22a.

Alternatively, and more generally, the management software can execute on any suitable processor in any suitable system. For example, the data storage system management software can execute on a processor of the data storage system 12.

In some embodiments, each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target logical address from which data is read from, or written to, depending on whether the I/O operation is, respectively, a read or a write operation request. The target logical address of the received I/O operation can be expressed in terms of a LUN or volume and logical address or offset location (e.g., LBA or logical block address) on the LUN. Processing can be performed on the data storage system to further map the target logical address of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system that includes multiple storage processors (SPs). Each of the SPs 27 can y be a CPU including one or more "cores" or processors and each can have their own memory used for communication between the different front end and back end components rather than utilize a global memory accessible to all storage processors. In such embodiments, the memory 26 can represent memory of each such storage processor.

Generally, the techniques of the present disclosure can be used in connection with any suitable storage system, appliance, device, and the like, in which data is stored.

The data path or I/O path can be characterized as the path or flow of I/O data through a system. For example, the data or I/O path is the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12.

The data path and control path define two sets of different logical flow paths. In at least some of the data storage system configurations, at least part of the hardware and network connections used for each of the data path and control path can differ. For example, although both control path and data path generally use a network for communications, some of the hardware and software used can differ. For example, with reference to the FIG. 1, a data storage system can have a separate physical connection 29 from a management system 22a to the data storage system 12 being managed whereby control commands are issued over such a physical connection 29. However, user I/O commands may never be issued over such a physical connection 29 provided solely for purposes of connecting the management system to the data storage system. In any case, the data path and control path each define two separate logical flow paths.

Figure 2:
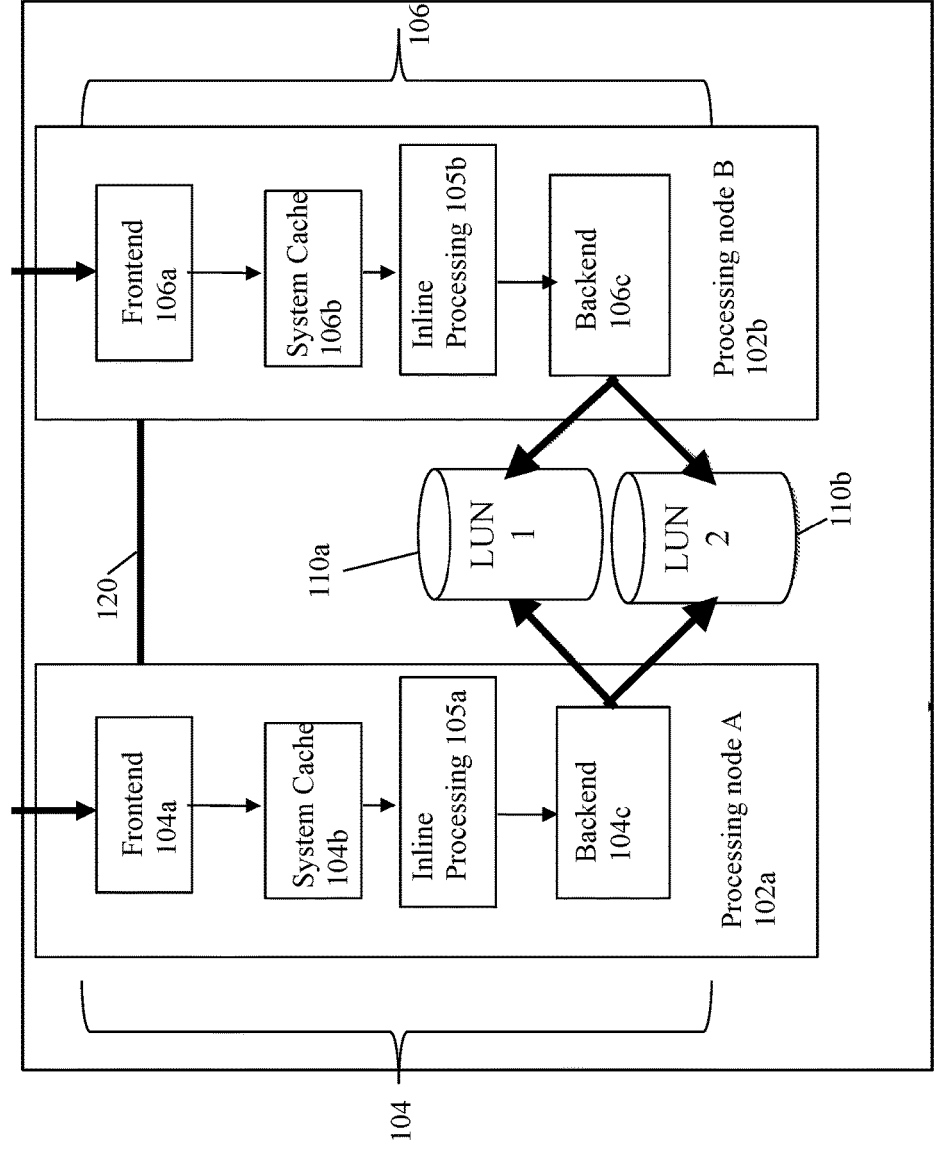
FIG. 2 is an example illustrating the I/O path or data path in connection with processing data in an embodiment in accordance with the techniques of the present disclosure.

With reference to the FIG. 2, shown is an example 100 illustrating components that included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one or more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is referred to herein as an active-active configuration.

In connection with a write operation received from a host, or other external client, and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a. In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Thus, in such an embodiment, rather than have dedicated hardware for an FA, DA, and the like, the components described above for the FA, DA, RA, and the like, can be viewed as logical or functional components where the tasks of such components can be implemented by code executed by processors of the nodes as illustrated in FIG. 2. Each node of the pair can include its own resources such as its own local (i.e., used only by the node) resources such as local processor(s), local memory, and the like.

Consistent with other discussion herein, a cache can be used for caching write I/O data and other cached information. The other cached information can include, for example, cached operations or commands such as create snapshot commands. In one system, the cache can be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs provides a persistent cache that can be referred to as a data journal, log or log tier used in the data storage system. In such a system, the caching devices or PDs are non-volatile log devices or PDs upon which the log is persistently stored. In at least one embodiment, in addition to such a persistently stored log, one or more of the nodes can also include node-local in-memory copies of information of the log. In at least one embodiment, the node-local in-memory copies of information of the log stored on each node can be stored in volatile memory, such as a RAM, that is local to the node and can be accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 3:
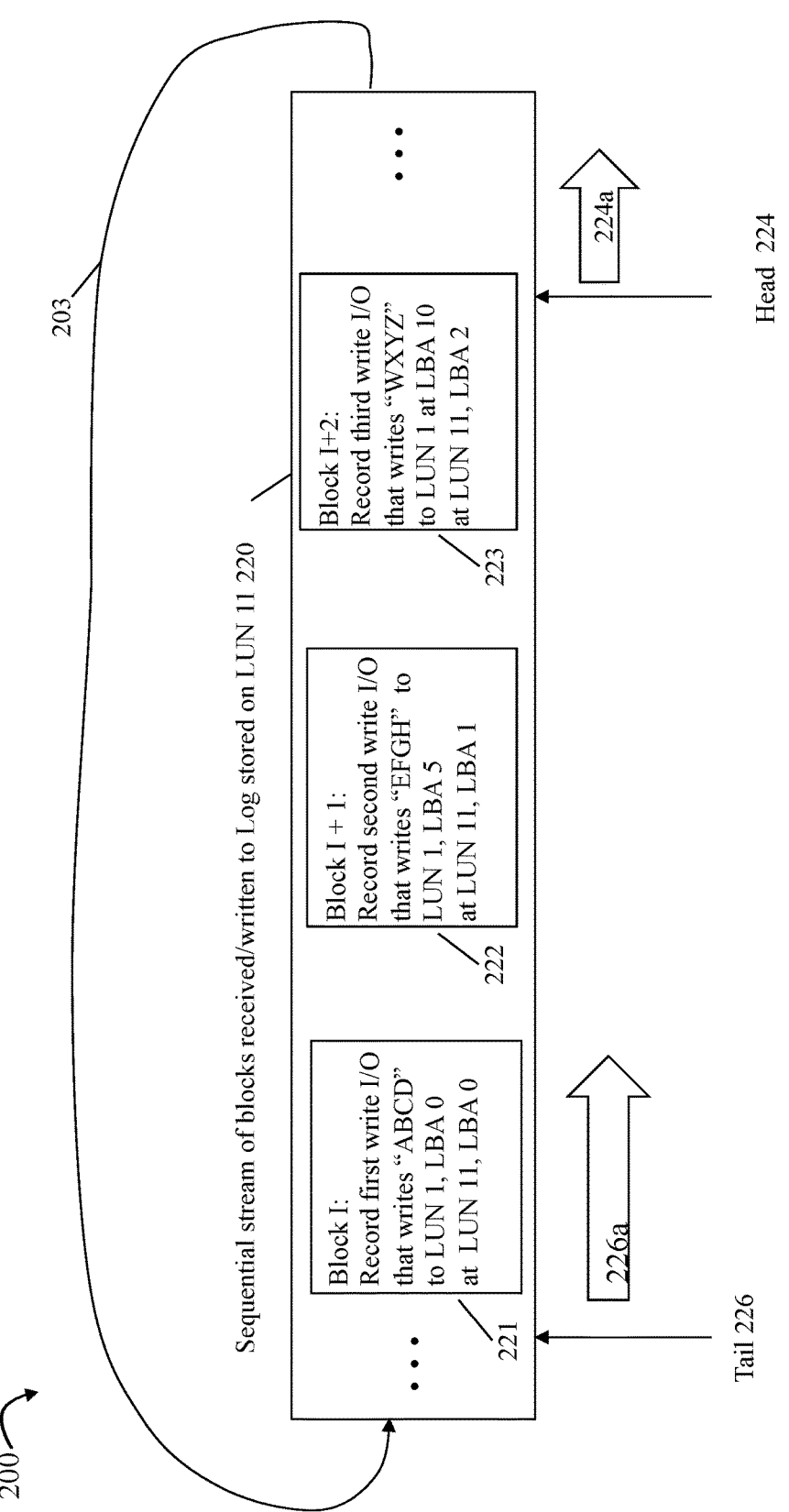
FIGS. 3, 4 and 5 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
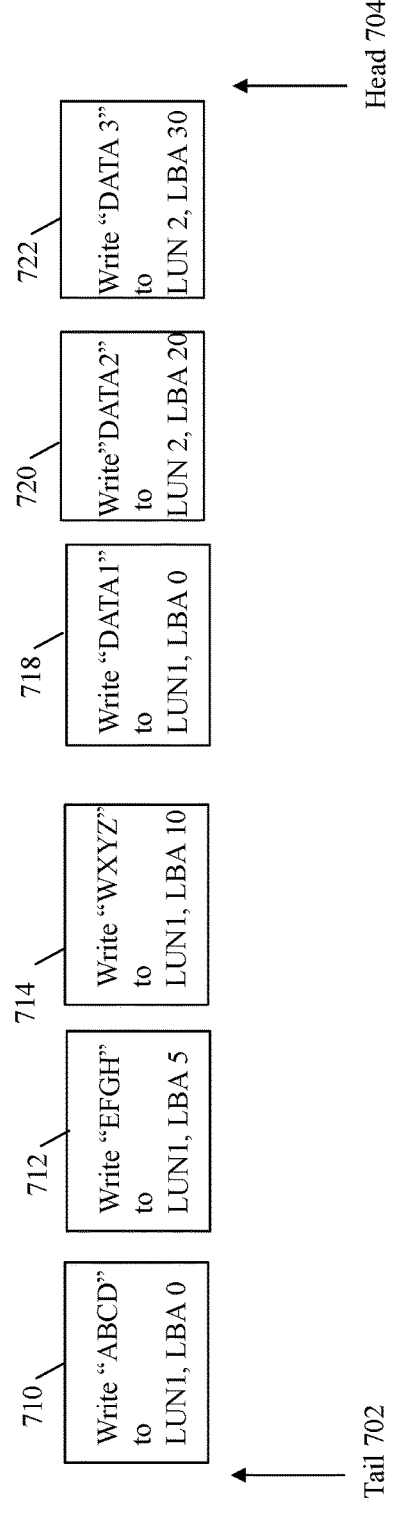

Referring to FIG. 4, shown is an example of information that can be included in a log in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 5:
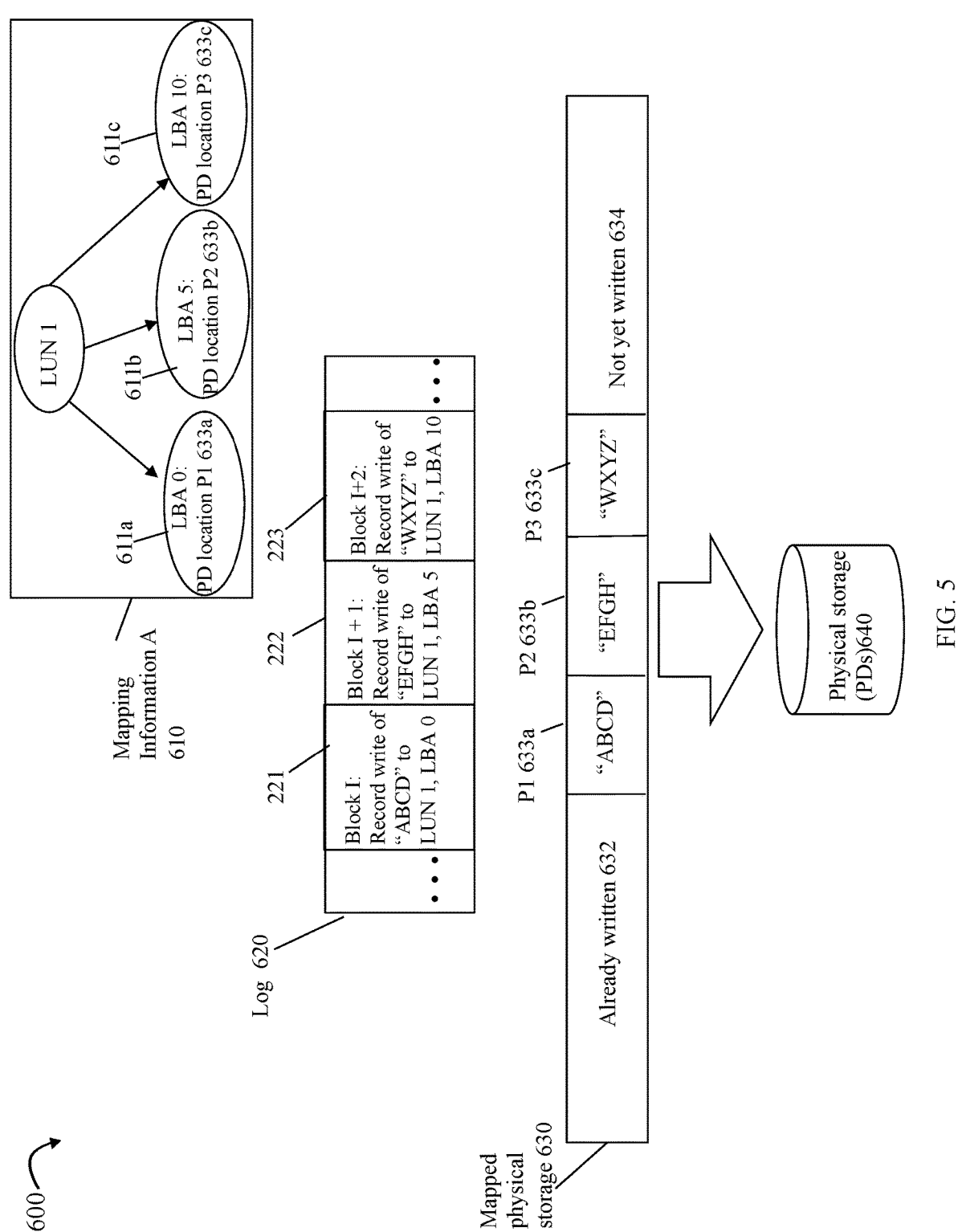

Referring to FIG. 5, shown is an example 600 illustrating the flushing of logged writes and the physical data layout of user data on BE PDs in at least one embodiment in accordance with the techniques of the present disclosure. FIG. 5 includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

In at least one embodiment with a dual node appliance or data storage system such as illustrated in FIG. 2, one of the two nodes can be designated as the primary node with the other peer node designated as the secondary or non-primary peer node.

In embodiments in accordance with the techniques of the present disclosure, write operations can be recorded in the log using different object types or structure. A first structure of the log can include records of the data written by the received write operations, and a second structure of the log can include records that are descriptors for the received write operations. For example, the write operation data or payload can be stored in a record of the first structure in the log. Additionally, a descriptor for the write operation can be stored in a record of the second structure in the log, where the descriptor can reference a record in the first structure including the write data written by the write operation. In at least one embodiment, the foregoing first structure recording the write data payload can be generally a pool of data blocks; and the second structure of descriptors can be a ring buffer. A ring buffer is generally known in the art. A ring buffer is a ring of records or entries. The ring buffer can be maintained using pointers, such as a head pointer and a tail pointer, where new entries of the ring can be allocated from the head and space reclamation can be done from the tail. When an entry at the tail is flushed, the entry can be freed and thus reclaimed for reuse. The tail can be advanced as entries are flushed. In a similar manner, as entries are allocated, the head pointer is advanced. Although particular structures, such as a ring buffer, are described herein, more generally, any suitable structure and/or organization can be utilized with the techniques of the present disclosure.

Figure 6:
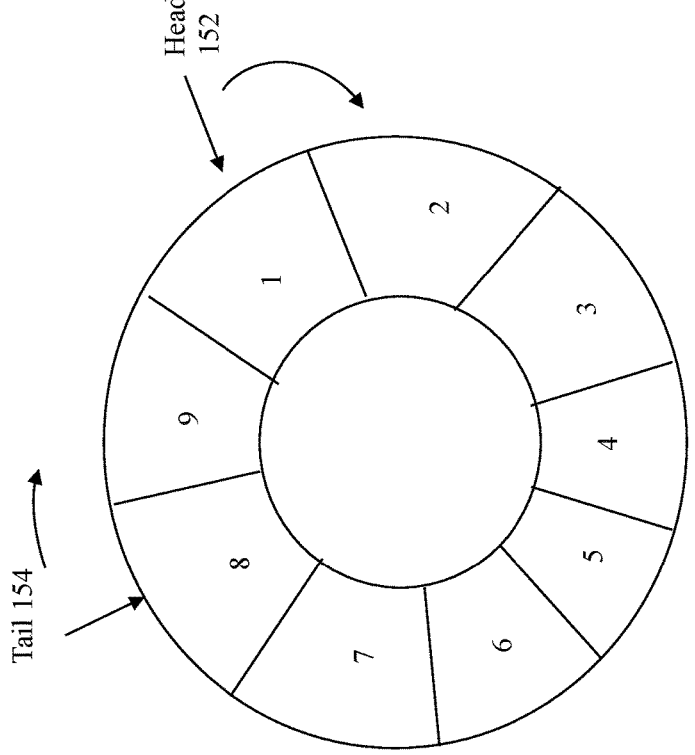
FIG. 6 is an example of a ring buffer structure that can be used in at least one embodiment in accordance with the techniques of the present disclosure.

Referring to FIG. 6, shown is an example 150 illustrating a ring buffer. The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. The tail pointer 154 can denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array where, for example, the entries 1 through 9 as in FIG. 6 correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 6.

Generally, the tail pointer of the ring buffer of FIG. 6 cannot be advanced beyond entries which are in use or not yet flushed. For example, assume at a first point in time the tail pointer points to entry 5 where entry 5 is currently being flushed and then, at a second point in time, entries 6 and 7 have been flushed but flushing is not yet complete for entry 5. The tail pointer remains at entry 5 even though entries 6 and 7 have been flushed. At a third subsequent point in time, entry 5 is flushed whereby the tail pointer is now advanced to entry 8 so that entries 1-7 between the head and tail pointers are free and reclaimed.

In at least one embodiment, both the first structure of logged data can be a pool of page blocks (PBs) where each PB includes the write data of a single logged write data block. The second structure of logged descriptors can be implemented as a ring buffer of page descriptors (PDESCs) where each PDESC includes a descriptor of a single logged request such as a write operation. For a write operation that writes a block of data, the logged write operation can be described by a PDESC of the log, the data written can be stored in a PB of the log, and the PDESC of the log can include a reference to the PB containing the data written. In some systems, requests or operations in addition to write operations can be recorded in the log using PDESCs where such PDESCs of these additional requests or operations may not have an associated PB.

In at least one embodiment, the size of each PB can generally be much larger than each PDESC. For example, in at least one embodiment, each PB can be 4K bytes or 8K bytes in size, and each PDESC can be ½ Kbyte or smaller. Thus generally, the total amount of storage used for the PBs of the log is much greater than the total amount of storage used for the PDESCs of the log.

It should be noted that the flushing of the log can be performed in response to an occurrence of any one or more defined conditions. For example, the log can be flushed in response to determining that the amount of reclaimed log space available for use and allocation is less than a specified threshold amount or size. As another example, the log can be flushed in response to determining that the amount of reclaimed PB space available for use and allocation is less than a specified threshold amount or size. As another example, the log can be flushed in response to determining that the amount of reclaimed PDESC space available for use and allocation is less than a specified threshold amount or size.

In at least one embodiment, the process of flushing the log includes flushing PDESCs and associated PBs of the log. In such an existing system, PDESC-PB pairs can be flushed, where each PDESC-PD pair denotes a logged write operation of a data block, and the PDESC of the pair points to or references the PB of the same pair. Multiple PDESC-PB pairs can be aggregated and flushed as a working set or unit. The particular PDESC-PB pairs flushed in the same working set or unit can be based on an application locality policy. For example, multiple PDESC-PB pairs included in the same working set can be flushed together where the PDESC-PB pairs of the working set write data to related logical addresses, such as LBAs of a LUN within the same contiguous logical address subrange. In some systems, multiple working sets of PDESC-PB pairs can be flushed in parallel by different flusher threads or processes of one or more nodes of the data storage system. As each PDESC-PB pair is flushed from the log to the BE PDs, the log space associated with the flushed PDESC and PB can be freed and reclaimed for reuse.

In at least one embodiment where the PBs are implemented using a pool of PBs, the PBs can be organized and maintained as a pool while the PDESCs can be organized and maintained as a ring buffer.

In at least one embodiment, the PDESC ring or ring buffer can be implemented as an array or linked list where each PDESC entry in the ring buffer can have an associated sequence number or identifier. Unique monotonically increasing sequence numbers or identifiers can be assigned to PDESC entries as they are used to log operations, such as write operations. The sequence numbers can denote the time dependent ordering of the logged operations or requests. A PDESC that generally references a PB can be referred to as a PDESC-PB pair where the PB of the pair contains the content stored at the logical address included in the PDESC of the pair.

In at least one embodiment, the PB pool can be implemented using an array or linked list of PB entries. In one embodiment, a list of PBs can be denoted as a list of indices associated with the PBs. A bit vector can include a different bit for each PB, where the bit associated with a PB has a value of 1 when the PB is allocated and the bit associated with the PB otherwise has a value of 0 when the PB is unallocated or free. Once a PB is flushed, it can be reclaimed or released immediately by indicating that its associated index or bit in the bit vector denotes the state of unallocated or free (e.g., where the bit is set to 0). Thus, using the PB pool rather than a PB ring buffer has no dependencies, problems or constraints that can occur, for example, due to tail pointer management of the ring buffer. With a PB pool, each PB can be released or reclaimed immediately after the data of the PB has been flushed or destaged to a BE PD.

Before proceeding with further description and considerations of an embodiment in accordance with the techniques of the present disclosure, following is a discussion of additional details regarding use of a metadata (MD) structure of mapping information that can be used in at least one embodiment in accordance with the techniques of the present disclosure, sequence numbers or identifiers (IDs) that can be used in at least one embodiment in accordance with the techniques of the present disclosure, and additional information regarding use of PDESCs and PBs for recording operations in the log.

The mapping information can be used to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information can include a MD structure that is hierarchical structure of multiple layers.

Figure 7:
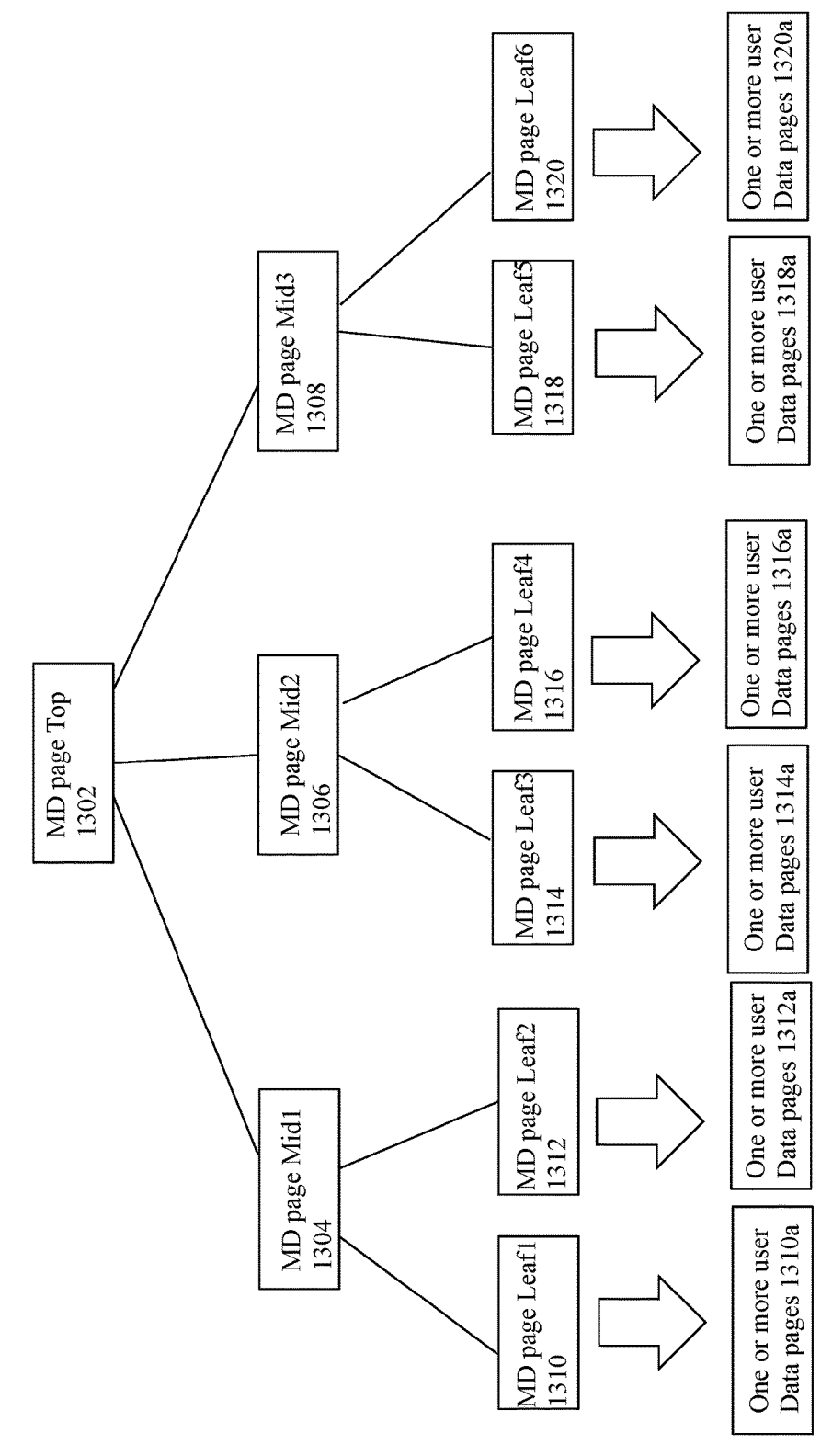
FIG. 7 is an example representation of mapping information of hierarchy of metadata pages that can be used in mapping logical addresses to physical storage locations in an embodiment in accordance with the techniques of the present disclosure.

In at least one embodiment, the mapping structure for a LUN, such as a LUN A, can be in the form of a tree having a plurality of levels. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree can correspond to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure has up to a maximum of N child nodes. For simplicity of illustration, the tree structure of MD pages, corresponding to the mapping structure in at least one embodiment, is represented in FIG. 7 as including only 3 levels where each node in the tree can have at most 3 child nodes. Generally, the techniques of the present disclosure can be used with any layered or hierarchical structure of MD pages.

Referring to FIG. 7, shown is an example 1300 of a tree of MD pages that can be used in an embodiment in accordance with the techniques of the present disclosure. The example 1300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 1300, the top or root level, level 1, includes MD page 1302; the mid or middle level, level 2, includes MD pages 1304, 1306 and 1308; and the bottom level, level 3, includes MD pages 1310, 1312, 1314, 1316, 1318 and 1320, which are also be referred to as leaf nodes or MD leaves. As also illustrated in the example 1300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 1310, 1312, 1314, 1316, 1318 and 1320 point or reference, respectively, one or more UD pages 1310a, 1312a, 1314a, 1316a, 1318a and 1320a.

The links or connections between a parent node (at level M) and its one or more child nodes (at level M+1) in the tree 1300 generally represent mappings between the parent node and the one or more child nodes. In at least one embodiment, the parent node can include a reference used to access (directly or indirectly) each of its one or more child nodes. For example, the root node MD page top 1302 can include addresses or pointers used to access each of its child nodes 1304, 1306 and 1308. The mid-level node MD page mid1 1304 can include addresses or pointers used to access each of its child leaf nodes 1310, 1312. The mid-level node MD page mid1 1306 can include addresses or pointers used to access each of its child leaf nodes 1314, 1316. The mid-level node MD page mid1 1308 can include addresses or pointers used to access each of its child leaf nodes 1318, 1320.

In at least one embodiment, each of the addresses or pointers included in a MD page that references a location in another MD page or references a location in a UD page can be a physical storage location on the back-end PDs. Thus, the traversal between connected nodes of the structure 1300 can correspond to traversing physical address or storage locations included in pages or nodes that are parent nodes.

In connection with accessing a particular UD page in at least one embodiment, all MD pages in a path from the root or top level of the tree to the UD page can be required to be traversed in a consecutive serialized order in which such pages appear in the path traversal down the path from the top or root level to the UD page accessed using a particular one of the MD page leaf nodes. For example, assume UD page or block X is included in the set of UD pages 1312*a*. In order to access UD page X of 1312*a*, the following denotes the consecutive serialized order in which the MD pages forming a sequence are accessed: MD page top 1302, MD page mid1 1304, and MD page leaf2 1312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 1302, MD page mid1 1304, and MD page leaf2 1312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 1300 can generally include multiple pointers or references to locations of its child nodes or pages. For example, MD page top 1302 includes pointers to locations of its child nodes, MD pages 1304, 1306 and 1308. MD page mid2 1306 includes pointers to locations of its child nodes, MD pages 1314 and 1316.

The data pages 1310*a*, 1312*a*, 1314*a*, 1316*a*, 1318*a* and 1320*a* include UD or content stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 7, the data pages 1310*a*, 1312*a*, 1314*a*, 1316*a*, 1318*a* and 1320 each include user data stored on particular logical addresses of the LUN A's logical address space. It may be, for example, that element 1310*a* includes user data stored at a first set of LBAs 0-511; and that element 1312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 1310*a* denotes data pages for LBAs 0-511; the element 1312*a* denotes data pages for the LBAs 512-1023; the element 1314*a* denotes data pages for LBAs 1024-1535; the element 1316*a* denotes data pages for LBAs 1536-2047, and so on.

In at least one embodiment, when the structure 1300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 1302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 1300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 1300 to determine the data block for a particular LUN and LBA. Similarly, it is a straightforward mathematical calculation to determine the index, offset or entry in a particular page or node to be accessed in connection with obtaining data blocks stored at the particular LUN and LBAs of the LUN. Each MD page in 1300 can be known to include MD relevant for accessing data on a particular LUN and one or more LBAs of that LUN. For example, consistent with discussion above, element 310*a* denotes the data blocks for LBAs 0-511 of a LUN. In order to access the data block for an LBA of the LUN in the LBA subrange 0-511, MD pages 1302, 1304 and 1310 can be traversed in sequential order. In particular, the first entry or offset of the MD page top 1302 can contain the address of the MD page mid 1 1304; the first entry or offset of the MD page mid 1 1304 can contain the address of the MD page leaf 1 1310; and the first entry or offset of the MD page leaf 1 1310 can contain the address of the data blocks for 1310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

In an embodiment in accordance with the techniques of the present disclosure for purposes of data integrity and correctness, the time order dependency of the logged data and operations of the log needs to be maintained. The time order is with respect to the relative order in which the operations are to be applied to the stored data of the data storage system to ensure data integrity and correctness. In an active-active system where I/Os can be serviced by both nodes of the dual node system, the time order dependency requirement needs to be maintained and synchronized across both nodes of the system. For example, at a first point in time, the node A can process a first write that is acknowledged to the host as completed. The first write can write first data to a first logical address, where the first write is stored in the log and subsequently flushed to the BE PDs. At a second point in time subsequent to the first point in time, the node A can process a second write that is acknowledged to the host as completed. The second write can write second data to the first logical address where the second write is also stored in the log and subsequently flushed to the BE PDs. When flushing the logged first data of the first write and the logged second data of the second write, the time order dependency or requirement is that the second data of the second write needs to be stored to the physical storage containing the data for the first logical address after the first data in order to ensure that the actual physical storage contains the correct data expected by the host based on the order in which the first and second writes were acknowledged to the host as being applied to the first logical address. Since the second write is acknowledged as successfully complete subsequent to the successful acknowledgement of the first write, the host expects the first logical address to contain the second data written (or overwritten) by the second subsequent write. In at least one system, the time order of logged data and operations can be denoted using global sequence numbers or IDs. Any optimizations performed such as, for example, in connection with parallel flushing must maintain the same resulting data content as described by the time order dependency denoting the logical ordering in which the logged requests or operations are applied.

In one such dual node system in accordance with the techniques of the present disclosure, one of the two nodes can be designated as the primary node which assigns each logged operation a new unique sequence ID. The sequence ID of the logged requests or operations denote the time dependent order in which such logged requests or operations are logically applied to the stored data on the BE PDs in order to maintain the data integrity and data content and expected by the host or other clients. The order in which the data is flushed from the log to the BE PDs maintains the time order requirement or dependency as denoted by the sequence IDs.

Thus, the designated primary node of the system node pair is designated as the primary node with respect to all write operations and other operations included in the log across all the LUNs configured from storage of the BE PDs accessible by the node pair. The primary node, for example, assigns a unique sequence ID to each write I/O operation having its write data stored in the log. In at least one embodiment, the primary node can assign all the sequence IDs independent of which node receives the write I/O or other operation having corresponding logged data that is subsequently flushed from the log. Thus, the primary node assigns sequence IDs for writes and other commands or operations that are logged, where such writes and other commands are received collectively by both the primary node and the non-primary node of the pair. The sequence IDs assigned establish the time order. In particular, the time order can be denoted by the monotonically increasing sequence IDs assigned to logged request or operation. To illustrate, assume a first sequence ID is assigned to a first write I/O that writes first data, a second sequence ID is assigned to a second write I/O that writes second data, and the first sequence ID is less than the second sequence ID. In this case, the first write I/O and first data occur in the time order sequence prior to the second write I/O and second data, where the first write I/O and the first data are written or applied prior to the second write I/O and the second data. In this manner, the sequence IDs assigned by the primary node are used to establish the time order dependency of all the write I/Os written to all the LUNs configured from storage of the BE PDs where the pair of nodes services all I/Os directed to such LUNs.

In one dual node system in at least one embodiment in accordance with the techniques of the present disclosure, the log can include page blocks or PBs and page descriptors or PDESCs as mentioned above. Each write I/O that writes data to a target logical address can have its associated write data stored in the log using a PB and a PDESC. The write data is stored in a PB and the PDESC references or points to the PB containing the write data. The PDESC can generally include other information regarding the write I/O such as, for example, the target logical address (e.g., LUN and LBA or offset), the sequence ID, a pointer (ptr) or reference to the PB including the write data associated with the PDESC, and other information such as flags associated with the logged operation or request.

In one such dual node system, the designated primary node that assigns sequence IDs can also be the node managing the page descriptors or PDESCs stored in the log. Thus the primary node can be the sole node of the pair that assigns sequence IDs of logged requests or operations received by both nodes. The primary node can also be the sole node that handles allocating PDESCs and freeing PDESCs on behalf of requests or operations received by both nodes. Thus, in an active-active configuration where both nodes of the pair can receive I/Os and other commands, all requests for new sequence IDs and new PDESC allocations of the log can be done only by the primary node even though the received I/Os or other commands may be received by the peer non-primary node. The primary node can assign monotonically increasing sequence IDs to new requests. In such a system, each node receiving the I/O or other command recorded in the log obtains an available PB from the log.

In at least one embodiment in accordance with the techniques of the present disclosure, a complete set of the PDESCs of the log can be stored in the local volatile memory of each node, where the complete set of PDESCs can be local memory resident and are not evicted from the local memory of each node. In contrast, at least some of the PBs of the log can be maintained in a portion of the node's local volatile memory used as a node-local cache that is subjected to eviction in accordance with local memory management of the node. In this manner, for a write operation that is received by a node, the data written by the write operation can be stored in a PB of the log. Additionally, the node receiving the write can store the write data in the node's volatile memory cache managed in accordance with the local memory management of the node's cache policy. Thus, the write data written by the write operation can be expected to be, or is likely to be, in the local volatile memory cache of the node that received the write operation.

In at least one embodiment in accordance with the techniques of the present disclosure, each of the nodes can also maintain its local volatile memory one or more flush working sets (FWSs) (also sometimes referred to herein simply as working sets). In at least one embodiment, the FWS can be a structure that organizes recorded or logged operations each represented by a PDESC-PB pair of the persistently stored log into logical groupings or containers of logged operations. In at least one embodiment, the FWS can be a hierarchical structure that includes containers of PDESCs. The PDESCs of a container can be, for example, a linked list of the PDESCs also stored in the volatile memory of each node. In at least one embodiment as discussed elsewhere herein, each container can be associated with a specified LBA subrange of consecutive LBAs of a particular LUN. In this manner, a container can include a linked list that connects together in the same container those PDESC for logged writes that write data to an LBA in the specified LBA subrange of the container.

In at least one embodiment, multiple log records of the log associated with the same MD leaf can be included in the same container. As discussed elsewhere herein, each MD leaf can be associated with an LBA subrange of a LUN, where the MD leaf is included in the MD or mapping information used to map logical addresses in the LBA subrange to corresponding physical storage locations. Thus each container can be associated with an LBA subrange of one of the MD leaves, where the container includes the PDESCs of logged writes that write data to an LBA in the LBA subrange of the one MD leaf.

In at least one embodiment, a PDESC can be added to the FWS of each node as the node performs processing for the PDESC. In this manner, each node can maintain the PDESCs organized in an arrangement of containers of the FWS. When one node, such as an initiator, modifies or updates its FWS, processing is also performed to synchronize the FWS of its peer node and also apply the same modification or update to the peer's FWS.

In at least one embodiment, the FWS of each node can be a hierarchical structure such as a tree, one or more hash tables, or other suitable structures that can vary with embodiment. Generally, the FWS can be characterized as a structure of containers that can also sometimes be referred to herein as leaf containers (LCs), where each LC can be associated with an LBA range of a different one of the MD leaf nodes of the mapping information. In at least one embodiment, each LC can be associated with one of the MD leaves, where the LC can include a linked list of the PDESCs of logged operations directed to an LBA associated with the MD leaf. In this manner, the FWS can generally represent the content of the log organized and sorted by LCs. In at least one embodiment, a PDESC for a logged write can be added to the FWS of a node during ingestion of the write.

In at least one embodiment, each of the two nodes can include a node local copy of the FWS in volatile memory of the node. In at least one embodiment, the FWS of each node can include no instances of LCs when the system starts up. In such an embodiment, each instance of an LC in the FWS of a node can be created or allocated dynamically in connection with servicing the initial (e.g., first in time) write to a particular LC. Each LC can be associated with a defined LBA range so that the initial write to the defined LBA range triggers the allocation or creation of the LC structure instance on each node's local FWS.

In some contexts herein, a particular node receiving a write or other operation can be referred to as an initiator node with respect to the particular write or other operation.

In connection with each node performing processing, such as in accordance with the protocol to commit or record a write operation, the write operation can write to a target logical address. The target logical address is included in a defined LBA range that is associated with one of the MD leaf nodes, and the defined LBA range is also associated with an LC including logged writes falling in the defined LBA range. For a node processing the first or the initial write to the defined LBA range associated with a MD leaf where the MD leaf is further associated with an LC, an instance of the LC in the node's local FWS can be created. Additional processing in the protocol can include synchronizing the peer's FWS with the initiator's FWS where such additional processing can also result in creating or allocating an instance of the LC in the peer node's FWS if such an instance of the LC having the defined range does not already exist in the peer node's FWS.

In at least one embodiment, each instance of an LC in the FWS of a node can be created or allocated dynamically as noted above. In such an embodiment, the LC can be implemented as a structure including a linked list of PDESCs of recorded or logged operations, where the PDESCs of the LC's linked list can be the node's local copies of the PDESCs. When the LC is initially created or allocated, the particular items created or allocated can vary with the particular structure used to implement the LC. In at least one embodiment in which each LC is implemented as a structure including the linked list, the initial allocation or creation of the LC can include, for example, allocating the LC structure, allocating pointers and other items used to generally maintain the linked list of PDESCs (e.g., pointers used to maintain the linked list such as to add and remove PDESCs from the list, and the like).

Figure 8:
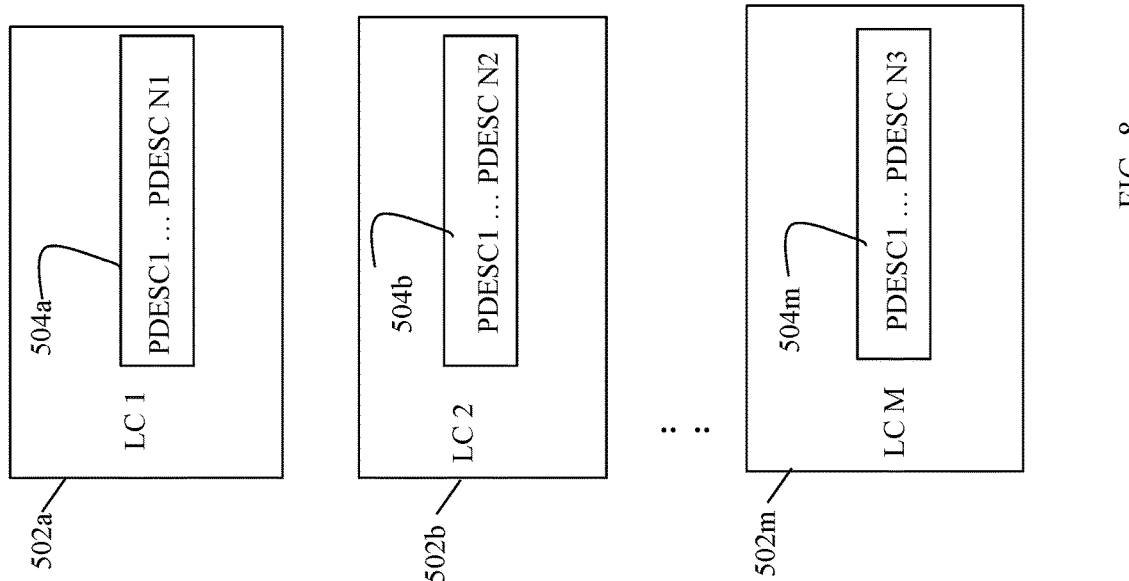
FIG. 8 is an example of containers of logged operations in an embodiment in accordance with the techniques of the present disclosure.

Referring to FIG. 8, shown is an example 500 illustrating LC instances of an FWS of a node in at least one embodiment in accordance the techniques of the present disclosure. Consistent with other discussion herein, the FWS 500 can generally be any suitable structure or arrangement used to organize the LCs of logged requests or operations of the log. The FWS can be, for example, a tree structure, one or more hash tables, or other hierarchical structure used to maintain the LCs in a sorted organization to facilitate lookup of a particular LC given a particular LBA. At a point in time P, the FWS of a node can include the PDESCs of the logged requests or operations currently stored in the log at the time P. As discussed elsewhere herein, each node can store its own local copy or instance of the FWS whereby the protocol discussed elsewhere herein provides for maintaining synchronized copies of the FWS on both nodes in a dual node system.

The example 500 illustrates an example of the FWS after the system has processed multiple writes that are recorded in the log, where each of the writes is recorded in the log using a PDESC-PB pair. The FWS 500 includes the LCs 502a-m. The LC 1 502a includes a linked list of PDESCs 504a. The LC 2 502b includes a linked list of PDESCs 504b. The LC M 502m includes a linked list of PDESCs 504m. Thus, the FWS can be characterized in one aspect as a structure comprising LCs, where the LCs include the PDESCs of the log.

In at least one embodiment, each node can include a local volatile memory copy of the PDESCs of the log, where the FWS can further include the LCs 502a-m that are linked lists formed using the PDESCs stored in the node's local copy. Thus the LCs of the FWS can denote a particular logical organization or grouping of the PDESCs of logged operations based on the target logical address LUN and LBA of the logged operations described by the PDESCs. Each of the LCs 502a-m has an associated LBA range of a particular LUN, and each PDESC of a logged operation is included a particular one of the LC's, where the PDESC's target logical address falls in the associated LBA range of the particular one LC. In this example, each LC of the FWS can be implemented as a structure including a linked list of PDESCs. More generally any suitable structure can be used for each of the LCs.

At the start, boot, or initialization of system, there may be no logged writes so the FWS includes no LCs and no PDESCs of logged writes. Each LC instance of an FWS can be created in response to processing the initial operation, such as the initial write, that is mapped to the LC instance. For example the initial write can be directed to an LBA that falls into the LBA range of the LC instance 502a whereby the LC instance 502a is created in response to the initial write, and the log record of the initial write is included on the linked list 504a of the LC instance 502a. Subsequent writes or requests that are mapped to the same LC instance 502a are placed on the linked list 504a.

To further illustrate, assume that there is an empty log and thus there are no LCs and no PDESCs in the log or the FWS. At a first point in time P1, assume the data storage system receives a first write that writes first data to a first logical address at LUN A, LBA 0. Assume each of the LCs 502a-m has an associated LBA range of 512 corresponding to the size of the LBA range associated with each MD leaf in at least one embodiment in accordance with the techniques of the present disclosure. However, at the time P1, none of the LCs 502a-m have been created and are not yet included in the FWS of the node A and not included in the FWS of the node B. In response to receiving the first write, each of the nodes A and B can create their own node-local instance of the LC1 502a having an associated LBA range of 0-511 for the LUN A, and can associate the logged record of the first write with the LC 502a. The first write can be recorded in the log using a first PDESC-PB pair of the log, where each node's local copy of the PDESC of the first pair can be included on the linked list 504a of PDESCs having associated LBAs that fall in the LBA range 0-511.

At a second point in time P2 subsequent to P1, a second write is received by the data storage system, where the second write writes second data to the logical address LUN A, LBA 100. The second write can be recorded in the log using a second PDESC-PB pair of the log, where each node's local copy of the PDESC of the second pair can be included on the linked list 504a of PDESCs having associated LBAs that fall in the LBA range 0-511.

At a third point in time P3 subsequent to P2, a third write is received by the data storage system, where the third write writes third data to the logical address LUN A, LBA 1000. The third write can be recorded in the log using a third PDESC-PB pair of the log. The PDESC of the third pair is directed to the LBA 1000 that falls into the LBA range of 512-1023 associated with the second LC 502b. Each of the nodes A and B can determine that the second LC 502b does not yet exist in the FWS of each of the nodes A and B. As such, the node A can create a node-local instance of the LC 502b having the associated LBA range of 512-1023, and include the LC 502b in its node local FWS. The node B can create a node-local instance of the LC 502b having the associated LBA range of 512-1023, and include the LC 502b in its node local FWS. Additionally, each node can create a local copy of the PDESC of the third pair that is included on the linked list 504b of PDESCs having associated LBAs that fall in the LBA range 512-1023 of the LC 502b.

As discussed elsewhere herein with a protocol used to process received operations or requests, such as write operations received by the nodes, each of the nodes can include a local copy of the FWS where the local copies of the two nodes can be synchronized as each received write operation is processed using the protocol.

In at least one embodiment, the FWS of a node can be shared and used by flush worker threads or processes of the node. In at least one embodiment, both of the nodes in a dual node system can independently perform processing to flush the log when log flushing has been triggered. In connection with flushing the log, data is destaged from the log to the non-volatile BE PDs and the log space can be reclaimed for reuse.

When flushing, each of the nodes can execute one or more code entities, such as flush worker threads or processes, that operate independently. In at least one embodiment, flush worker threads executing on a node can use the node's local FWS and detach LCs from the node's local FWS for flushing. Since the FWS is a structure that can be shared among multiple flush worker threads or processes on the same node, any suitable synchronization technique can be used to synchronize access to the FWS among such threads or processes executing on the same node. As discussed in more detail below, flush worker threads of a node, such as node A, can detach LCs of the FWS stored locally on the node A.

Generally, any suitable technique can be used to assign LCs to flush worker threads of the nodes A and B. For example, in at least one embodiment, LCs can be assigned to particular nodes for flushing based on a defined policy. For example, the policy can specify that particular node which received the first or initial write to a particular LC is assigned the LC for flushing. As another example, the policy can specify a predefined mechanism for assigning LCs to different nodes for flushing. In at least one embodiment, LCs can have associated unique LC identifiers which are positive integers and the policy can specify that all LCs with an odd numbered LC identifier are assigned for flushing to a first of the two nodes in a dual node system, and all LCs with an even numbered LC identifier are assigned for flushing to the second remaining node of the dual node system. Once the LC is assigned to a particular node, the LC can be flushed by one of the flush worker threads of the assigned node. In connection with the foregoing policies, the LC assignment to a particular node for flushing can be performed without a flush manager or other code entity performing the assignment. In one embodiment, each node can have the same policy and associated rules and can independently determine which LCs are assigned to each node for flushing.

The LCs can be viewed as detachable units or containers of PDESCs of the log to be flushed in accordance with the policy as noted above. Thus, a thread or process of a node, such as the node A, performing flushing can detach LCs from the FWS of the node A until a sufficient number of LCs have been detached to fill a buffer of a particular size to be destaged from the log to the BE PDs. The buffer can include the PBs of the user data or content stored by the logged write operations. The mapping information or MD (e.g., FIG. 7) used to map logical address to physical storage locations can also be accordingly updated as the logged writes are flushed from the log to the BE PDs. Additionally, as the LCs of the PDESCs or the logged writes are flushed from the log, the FWSs of the nodes and the log can be accordingly updated. Log space (e.g., the PDESCs and PBs of the log) associated with the flushed records can be reclaimed for reuse.

In at least one embodiment, each logged write operation can be represented by a PDESC-PB pair of the log. Each LC can be associated with an LBA range of one of the LUNs storing user data. Storing the PDESC-PB pair in the log as part of the protocol described elsewhere herein can include storing the PDESC of the pair in a particular LC of the FWS structure on each of the nodes, where the PDESC-PB pair logs a write to a target logical address expressed using a target LUN and target LBA, and where the particular LC is associated with an LBA range including the target LBA for the target LUN. The particular LC in the FWS can be determined in any suitable manner. In at least one embodiment, the LBA range of a single LC can also be associated with a MD leaf. In this manner, the PDESCs of the same LC denote writes to the same LBA range associated with the same MD leaf. For example, in at least one embodiment, an LC associated with a particular MD leaf can be determined using a deterministic mathematical function that maps each PDESC-PB pair to an LC, where the PDESC-PB pair can write to a target LBA or offset of a target logical address and the LC has an associated LBA range including the target LBA.

Figure 9:
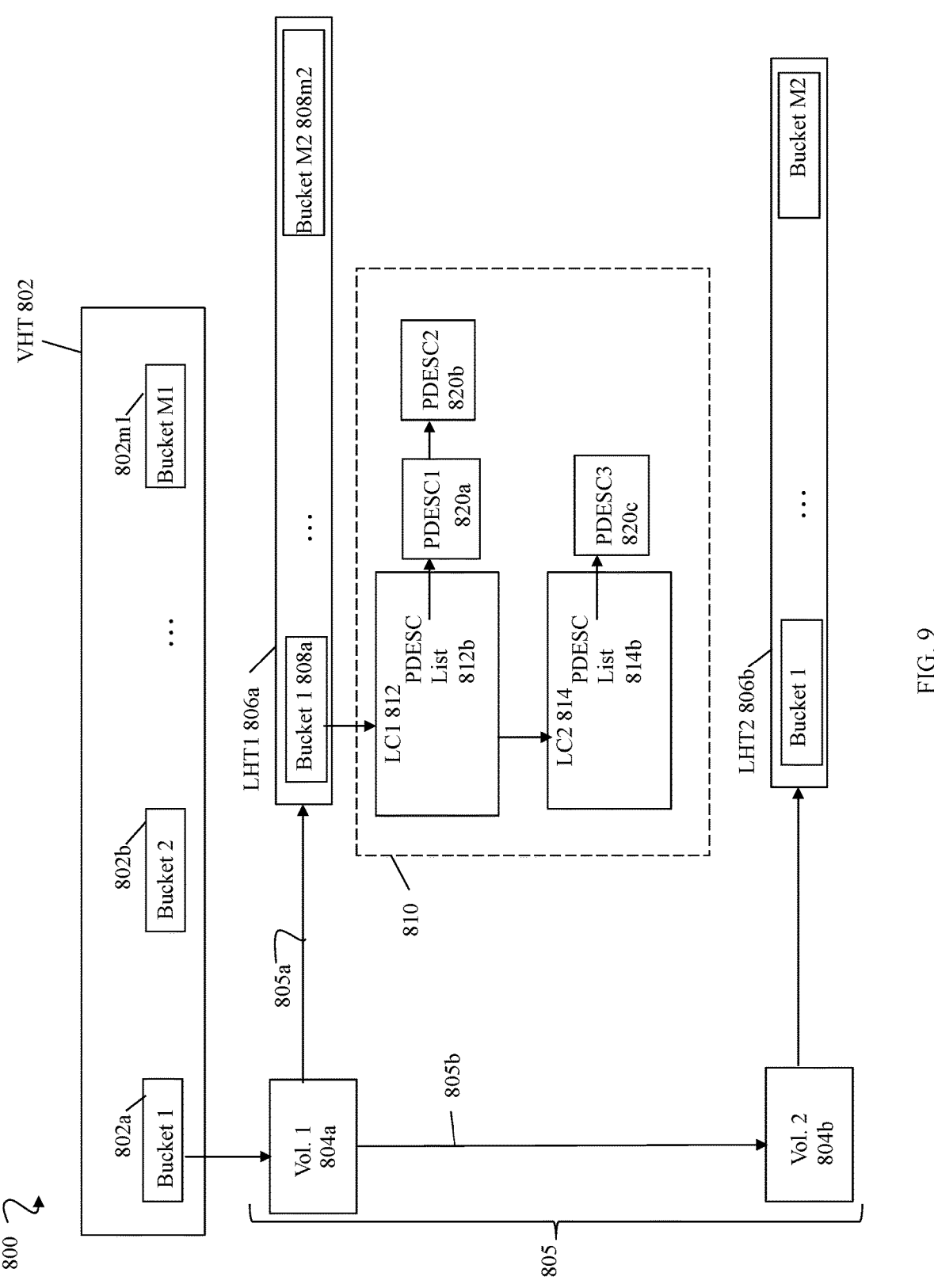
FIG. 9 is an example illustrating further detail regarding structures of a flush working set (FWS) in at least one embodiment in accordance with the techniques of the present disclosure.

Referring to FIG. 9, shown is an example 800 of further detail regarding an FWS structure in at least one embodiment in accordance with the techniques of the present disclosure.

The example 800 illustrates further details of the FWS structure stored in the volatile memory of each node of the system. The FWS 800 is a hierarchical 3 level structure including a volume hash table (VHT) 802 used to manage volumes or LUNs in the system, leaf hash tables (LHTs) 806a, 806b used to manage the leaf containers (LCs). Consistent with other discussion herein, each of the LCs corresponds to an associated LBA range or subrange of a LUN's LBA range. The LC includes a list of PDESCs of logged writes with target logical addresses that are included in the associated LBA range of the LC. In at least one embodiment, each LC can have an associated contiguous LBA range corresponding to that of a single MD leaf (e.g., 1310 of the example 1300 of FIG. 7).

The VHT 802 is a hash table of buckets 802a-m1, where each of the VHT buckets includes a list of LUNs or volumes having associated volume or LUN IDs (identifiers) that hash to a particular bucket. Generally, a write I/O writes data to a target logical address expressed as using a volume or LUN ID and an LBA or offset on the volume or LUN. The volume or LUN ID can be used to index into the VHT where the volume or LUN ID is mapped to one of the VHT buckets 802a-m1. For example, the LUN or volume ID=1 can be mapped, such as using a hash function, to the VHT bucket 1 802a (e.g., hash (LUN or volume ID)=VHT bucket index). The volume 1 (Vol. 1) has a corresponding entry 804a on the list of volume structures of the VHT buckets 802a. As another example, the LUN or volume ID=2 can be mapped, such as using a hash function, to the VHT bucket 1 802a. The volume 2 (Vol. 2) has a corresponding entry 804b on the list of volume structures of the VHT buckets 802a.

The elements 804a-b can denote volume structures which can be implemented as a data structure including any number of fields of information that can vary with embodiment. For example, each of the volume structures 804a-n can include a pointer to an LHT for the particular volume or LUN, the LUN or volume ID of the represented volume or LUN, a pointer to the next volume structure in the VHT bucket list, and the like. For example, the volume structure 804a includes a pointer (805a) to the LHT 806a, and a pointer (805b) to the next volume structure 804b in the volume structure list of the VHT bucket 802a.

In at least one embodiment, each volume structure 804 can have an associated LHT used to manage PDESCs of logged writes to the various LUNs or volumes. The LHT 806a includes buckets 808a-m2, where the LBA or offset, such as of the target logical address of the write I/O, can be used to index into the LHT. The LBA for a LUN or volume can be mapped, such as using a hash function, to a particular one of the LHT buckets 808a-m2 (e.g., hash (LUN LBA) =LHT bucket index).

In at least one embodiment, each of the LHT buckets 808a-m2 can be associated with a corresponding contiguous portion of the LBA range of the LUN or volume ID=1 (as represented using the volume structure 804a). Each LC of a particular LHT bucket can further include a contiguous LBA subrange falling within the LBA range of the associated LHT bucket. For a logged write to a target logical address, such as LUN 1, LBA 100, the LUN or volume ID of "1" can be hashed where the resulting hash value identifies the VHT bucket 1 802a. The linked list of volume structures 805 of the VHT bucket 802a can be sorted by LUN or volume ID and searched to locate the volume structure 804a for the LUN ID=1. The pointer 805c from the volume structure 804a references the LHT 806a for the LUN ID=1. The LBA=100 of the write I/O's target logical address can be hashed where the resulting hash value identifies the LHT bucket 806a. Each of the LHT buckets, such as 806a, can have an associated list of LCs, such as 810. For example, the element 810 includes the list of LCs associated with the LHT bucket 808a. The LCs of the 810 can be sorted by increasing LBA range corresponding to each of the LCs. The LBA of the target logical address can be mapped to a particular LC of the LHT bucket 808a where the logged write to the target logical address can be included on the list of logged writes of the particular LC. For example, the LHT bucket 808a can be associated with an LBA range from 0-1023 for LUN 1, where the LC 812 can have an associated LBA range of 0-511, and the LC 814 can have an associated LBA range of 512-1023. A logged write to the target logical address LUN 1, LBA 100 can be mapped to the VHT bucket 802a, the volume structure 804a, the LHT bucket 808a, and the LC 1 812. The logged write can be represented by an in-memory copy of the PDESC of the logged write. In other words, the log can persistently store a PDESC-PB pair for the logged write. Additionally, each node can store in its node-local memory a copy of the PDESC information on a list associated with a corresponding LC. For example, the PDESC 820a can describe the logged write to the target logical address LUN 1, LBA 100. In at least one embodiment, the PDESC of the FWS can reference or point to the persistently stored PB of the log as discussed elsewhere herein. Additionally, if the logged write denotes a write I/O that was received or ingested by a particular one of the nodes, a copy of the PB containing the write data can also be stored in the node's local cache, and the PDESC of the FWS on the node that ingested the write I/O can also point to or reference the node's cached copy of the PB. In at least one embodiment, if the logged write denotes a write I/O that was not received or ingested by a particular one of the nodes, the PB containing the write data is not cached in the node's local cache. Thus in at least one embodiment, the single one of the nodes A and B that ingests or receives a write I/O can cache a copy of the PB storing the write data in its node-local cache, and also have the logged write's PDESC of the FWS on the node reference or point to the node's cached copy of the PB. Additionally in such an embodiment, for the peer node that did not receive the write I/O, the logged write's PDESC of the FWS on the peer node references or points to the persistently stored PB of the log but does not reference or point to a cached copy of the PB.

In at least one embodiment, each of the LC structures 812-814 can include a pointer to the list of node local in-memory PDESCs of logged writes which write to a target logical address included in the contiguous LBA range associated with the LC. For example, the LC 812 includes a pointer 812b to the first element (820a) in the PDESC list of logged writes to target logical addresses included in the LBA range associated with LC 812. For example, the LC 814 includes a pointer 814b to the first element (820c) in the PDESC list of logged writes to target logical addresses included in the LBA range associated with LC 814.

Thus, each LC having an associated contiguous LBA range further has an associated list of PDESC-PB pairs representing logged writes which write to target logical address in the contiguous LBA range of the LC. The LCs of 810 of the LHT bucket 808a can be stored by increasing LBA range. The PDESCs of the list of teach LC, such as the PDESC list 812b of the LC 812, can be a time ordered list of logged writes based on the time when the logged write is received by the data storage system.

For simplicity of illustration, the example 800 shows a list of volume structures for only the VHT bucket 802a, and only a list of LCs for LHT bucket 808a. More generally, each of the VHT buckets 802b-m1 can similarly include lists of volume structures, and each of the LHT buckets can similarly include a list of LCs.

Figure 10:
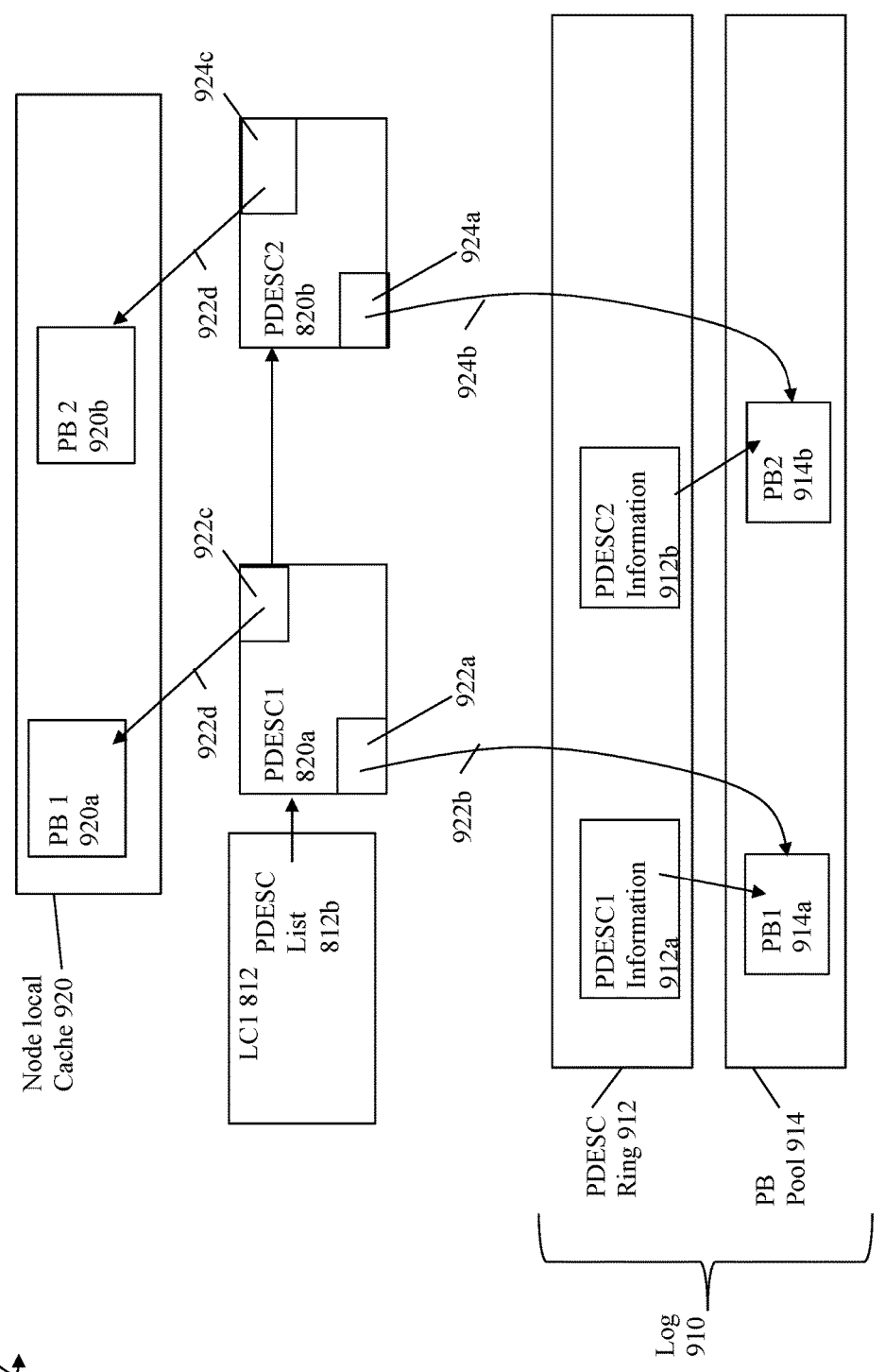
FIGS. 10 and 11 illustrate an example of content of structures of the nodes performing processing in at least one embodiment in accordance with the techniques of the present disclosure.

Referring to FIG. 10, shown is an example 900 illustrating in more detail the various structures in at least one embodiment in accordance with the techniques of the present disclosure. The example 900 includes the LC 812 and associated list of PDESCs 820a-b as in the example 800 of FIG. 9.

Additionally, the example 900 includes the node local cache 920 and the log 910. The log 910 can be the persistent non-volatile storage used for logging such as logging the write I/Os. The log 910 includes the PDESC ring 912 of persistently stored PDESCs, and the PB pool 914 of persistently stored PBs. The elements 812, 820a and 820b are stored in each node's local volatile memory as part of the FWS stored in the node's local volatile memory. Additionally, the element 920 denotes the node's local cache. For illustration, assume that the structures of 900 are associated with node A and that the system includes two nodes, A and B, as discussed elsewhere herein, in an active-active configuration where both the nodes A and B can receive and processing I/O operations. Assume that the node A (rather than the node B receives a first write I/O logged as a write I/O using the PDESC-PB pair 912a-914a, and the node A also receives a second write I/O logged as a write I/O using the PDESC-PB pair 912b-914b. The element 820a corresponds to the node A's in-memory node local copy of the PDESC for the first write I/O, where the PDESC 820a include the field 922a that references or points to (922b) the persistently stored PB 914a of the log 910. Additionally, since the node A (rather than the node B) ingests or receives the first write I/O, a copy of the write data as stored in the logged PB 914a is also stored as PB1 920a in the node A's local cache 920. The PDESC 820a can include the field 922c which references or points to (922d) to the cached copy PB 920a of the write data written by the first logged write I/O.

The element 820b corresponds to the node A's in-memory node local copy of the PDESC for the second write I/O where the PDESC 820b includes the field 924a that references or points to (924b) the persistently stored PB 914b of the log 910. Additionally, since the node A, rather than the node B, ingests or receives the second write I/O, a copy of the write data as persistently stored in the logged PB 914b is stored as the PB2 920b in the node A's local cache 920. The PDESC 820b can include the field 924c which references or points (922d) to the cached copy PB 920b of the write data written by the second logged write I/O.

Figure 11:
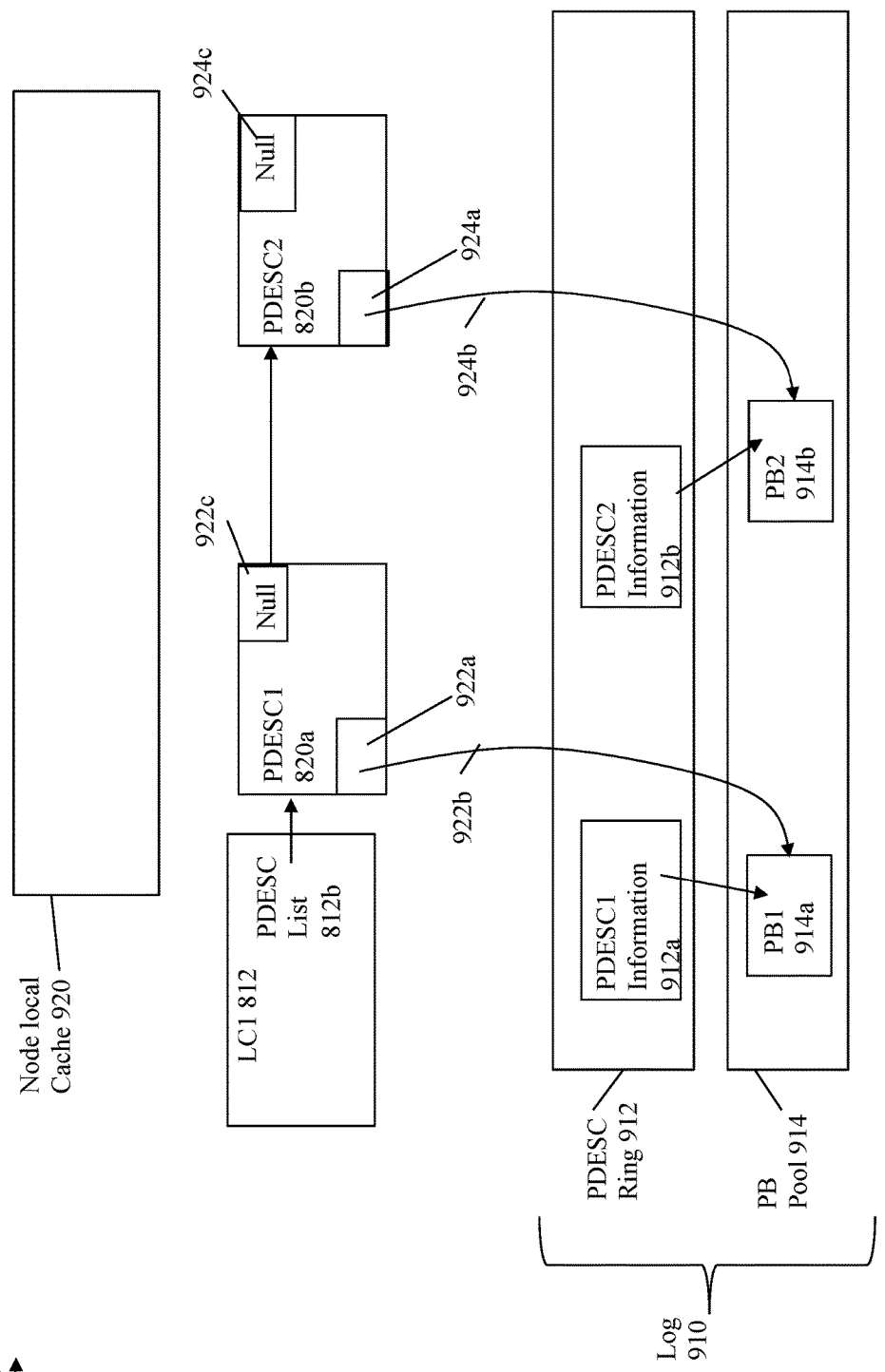

Continuing with the above example of 900, reference is made to FIG. 11, shown illustrating in more detail the various structures of the node B which does not ingest or receive either of the above-noted first and second write I/O operations. The example 950 illustrates the various structures as stored on node B in connection with the example 900 (which illustrates the various structures as stored on node A). The structures of the example 950 differ from those of the example 900 in that the node B (as illustrated in 950) does not cache the write data PB2 914b in its node local cache 920, and also does not cache the write data PB 914a in its node local cache 920. Thus, the node B's PDESC 820b has field 922c as null, and has field 924c as null.

The FWS can have an associated state and can transition between multiple defined states at various points in time. In at least one embodiment, possible FWS states can include frozen, active and idle or empty. An FWS can have the active state when the FWS can be updated to log new operations, such as new writes, and thus add new PDESCs to appropriate LCs and associated PDESC lists of the LCs. From the active state, the FWS can transition to the frozen state. An FWS can have the frozen state when updates to the FWS are not allowed. In the frozen state, updates to the FWS are not allowed in that the FWS is not updated to add new logged writes. Once an FWS is frozen, the logged writes of the FWS (e.g., as represented by the PDESCs on the PDESC lists of the LCs of the frozen FWS) can be flushed from the log and destaged to the BE PDs. Consistent with other discussion herein, as logged writes of a frozen FWS are flushed, log non-volatile storage as well as volatile memory of the FWS instance can be deallocated or reclaimed for reuse. In at least one embodiment with reference back to the example 800 of FIG. 9, the memory of instances of 810 of the LCs and lists of PDESCs represented the logged writes can be reclaimed or deallocated and thus made available for reuse as logged writes of the LCs are flushed. In at least one embodiment, once all logged writes of LCs of the frozen FWS are flushed, the FWS can transition from the frozen state to the idle or empty state. The idle or empty state denotes an FWS instance that does not include any logged writes and is currently inactive (e.g., new logged writes are not being added to the FWS instances. From the idle or empty state, the FWS can transition to the active state to be used to store PDESCs of logged writes or other operations. When in the idle or empty state, the FWS can have no LCs and no in-memory PDESC list of the LC. When the FWS is in the active state, an LC structure instance can be allocated and initialized responsive to the first or initial logged write of the LC, where an in-memory PDESC for the logged write is also added to the list of PDESCs of the LC.

Figure 12:
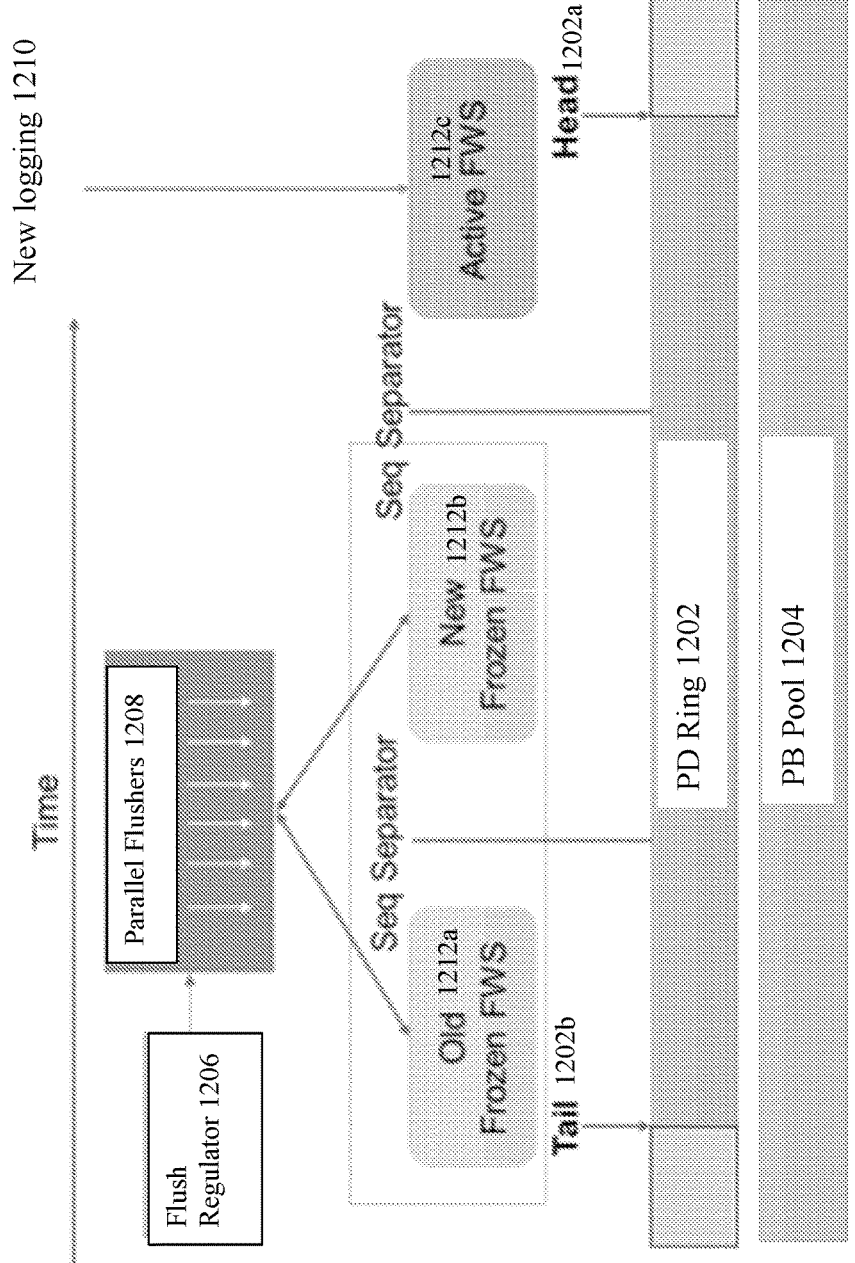
FIG. 12 is an example illustrating structures and data flow in connection with flushing in at least one embodiment in accordance with the techniques of the present disclosure.

Referring to FIG. 12, shown is an example 1200 illustrating components and structures of a node that can be used in connection with flushing performed by each node in at least one embodiment in accordance with the techniques of the present disclosure.

The flush regulator 1206 can regulate or control various aspects of the flushing performed by the node. In at least one embodiment, the flush regulator 1206 can, for example, vary the number of flusher threads or flushers that operate and/or execute in parallel (1208) at a point in time such as to vary the rate at which flushing of an FWS can be performed.

The elements 1212a-c denote the 3 FWS's of unflushed pages or blocks of data that can be included in each node's volatile memory. At any point in time, at most one FWS can be active on a node where newly logged operations (1210), such as new writes, are added to the active FWS 1212c. Parallel flushers 1208 of both nodes can flush the unflushed logged entries of the two frozen FWSs 1212a-b to the BE PDs until each such frozen FWS becomes empty (e.g., all unflushed logged entries are flushed from the FWS whereby the FWS transitions to empty). In at least one embodiment, memory used for LCs and associated PDESCs of an empty FWS can be reclaimed or deallocated and thus made available for reuse. Upon the occurrence of one or more conditions occurring, such as responsive to the active FWS 1212c becoming full, the active FWS can transition to the state of frozen, and an empty FWS can transition to the active state thereby becoming the new active FWS. In at least one embodiment which can include multiple frozen FWSs 1212a-b, flushing can be performed by flush worker threads to flush LCs from the old frozen FWS 1212*a* prior to flushing LCs from the new frozen FWS 1212*b* (i.e., where logged entries of FWS 1212*a* are all older than logged entries of FWS 1212*b*) in order to facilitate efficient reclamation and reuse of resources of the flushed logged entries such as based on tail movement or advancement in the ring buffer of PDESCs as described, for example, in connection with FIG. 6. Generally, flush worker threads can perform flushing of entries from the oldest frozen FWS, such as FWS 1212*a*, prior to flushing entries of newer or more recently frozen FWS, such as FWS 1212*b*.

In this manner, corresponding FWSs on both nodes A and B can be frozen so that A and B have a consistent view of the VHT, LHTSs, LCs and associated PDESC lists (of logged writes) on both nodes A and B. With reference back to the FIG. 9, the example 800 can represent an instance of a first frozen FWS on the node A having a corresponding instance of a second frozen FWS on node B. The foregoing two frozen FWS's on the nodes A and B can be corresponding in that they provide consistent views of the VHT, LHTSs, LCs and associated PDESC lists (of logged writes) on both nodes A and B.

As illustrated in connection with the example of FIGS. 10 and 11, the nodes A and B have consistent FWS views with respect to logged writes of the LC 812, where the logged writes are represented by the PDESCs 820*a-b*. The nodes A and B in connection with the FIGS. 10 and 11 can differ with respect to the PBs stored in the local caches 920 of the nodes A and B.

In at least one embodiment with a dual node system, a write I/O operation can be received at one of the nodes designated as the initiator with respect to the particular write I/O which write data to a target logical address. The protocol performed to process the write I/O and commit the write I/O to the log can include: the remaining peer node persistently storing a PDESC and a corresponding PB for the write I/O in the persistent log; the peer node adding an entry to the LC (in the peer node's local FWS where the LC corresponds to the target logical address) for the PDESC representing the write I/O operation; and the initiator node adding an entry to the LC (in the initiator node's local FWS where the LC corresponds to the target logical address) for the PDESC representing the write I/O operation.

As discussed above, to process received operations or requests, such as write operations received by the nodes, each of the nodes may include a local copy of the FWS where the local copies of the two nodes may be synchronized as each received write operation is processed.

In at least one embodiment, the FWS of a node may be node-local and shared and used by flush worker threads or processes of the node. In at least one embodiment, both of the nodes in a dual node system may independently perform processing to flush the log when log flushing has been triggered. In connection with flushing the log, logged operations represented by persistently stored entries in the log are flushed from the log. In particular, the logged operations can include logged write operations represented by PDESC-PB pairs of the log which are flushed to the non-volatile BE PDs. Subsequent to flushing logged operations from the log, the log space or storage of the flushed operations may be reclaimed for reuse.

When flushing, each of the nodes may execute one or more code entities, such as flush worker threads or processes, that operate independently. In at least one embodiment, flush worker threads executing on a node may use the node's local FWS and detach LCs from the node's local FWS for flushing. Since the FWS is a structure that may be shared among multiple flush worker threads or processes on the same node, any suitable synchronization technique may be used to synchronize access to the FWS among such threads or processes executing the same node. Flush worker threads of a node, such as node A, may detach LCs of the FWS stored locally on the node A. The LCs may be viewed as detachable units or containers of PDESCs of the log to be flushed. Thus, a thread or process of a node, such as the node A, performing flushing may detach LCs owned by the node A from the FWS of the node A until a sufficient number of LCs have been detached to fill a buffer of a particular size to be destaged from the log to the BE PDs. The buffer may include the PBs of the user data or content stored by the logged write operations. The mapping information or MD (e.g., FIG. 8) used to map logical address to physical storage locations may also be accordingly updated as the logged writes are flushed from the log to the BE PDs. Additionally, as the LCs of the PDESCs or the logged writes are flushed from the log, the FWS and the log may be accordingly updated. Log space (e.g., the PDESCs and PBs of the log) associated with the flushed records may be reclaimed for reuse.

In at least one embodiment, each logged write operation may be represented by a PDESC-PB pair of the log. Each LC may be associated with an LBA range of one of the LUNs storing user data. Storing the PDESC-PB pair in the log may include storing the PDESC of the pair in a particular LC of the FWS structure on each of the nodes, where the PDESC-PB pair logs a write to a target logical address expressed using a target LUN and target LBA, and where the particular LC is associated with an LBA range including the target LBA for the target LUN. The particular LC in the FWS may be determined in any suitable manner. In at least one embodiment, the LBA range of a single LC may also be associated with a MD leaf. In this manner, the PDESCs of the same LC may denote writes to the same LBA range associated with the same MD leaf. For example, in at least one embodiment, an LC associated with a particular MD leaf may be determined using a deterministic mathematical function that maps each PDESC-PB pair to an LC, where the PDESC-PB pair may write to a target LBA or offset of a target logical address and the LC has an associated LBA range including the target LBA.

Consistent with discussion herein, a system such as a data storage system can be a log-based system where writes, as well as possibly other commands and operations, can be persistently stored in a log. Use of the log to record writes and possibly other operations provides for improved write latency and thus improved performance of the data storage system. Once the write or other operation is recorded and persistently stored in the log, an acknowledgement regarding completion of the recorded operation can be sent to the originator of the write or other operation. The system can include multiple processing nodes which receive operations, such as the write operations recorded in the log. At a later point in time, entries of the log can be flushed and data written by the logged writes can be further persisted to back-end (BE) or long-term persistent storage. Once entries or records of the log have been flushed, resources associated with the flushed log entries can be reclaimed for reuse. For example, the persistent storage of the flushed log entries can be reclaimed for reuse in connection with persistently recording new write I/Os in the log.

To provide reliable, smooth and efficient flushing of the log (sometimes also referred to as the user data log or data log) and also efficient optimization of resources is generally a non-trivial task. For example, existing techniques may not provide smoothness and stability in connection with the flush processing rate. Existing techniques may not provide proper or adequate reclamation rates of resources used with logged entries. For example, resources may not be reclaimed for reuse at a sufficiently high rate thereby resulting in a resource shortage for recording new entries in the log. Additionally, reclamation of resources too early with too high a flush rate may reduce the risk of resource shortages but can result in inefficient data amortization and/or inefficient resource utilization. Furthermore, determining a desirable reclamation rate can vary with I/O workload.

Accordingly, described in the following paragraphs are techniques that overcome the foregoing drawbacks. The techniques of the present disclosure provide for efficient, reliable and adaptive regulation of flushing of the log. The techniques of the present disclosure provide for balancing and adapting the flush rate to reduce and/or eliminate resource shortages while also providing for an improved and/or optimal resource utilization. The techniques of the present disclosure provide for varying or adjusting the reclamation rate with I/O workload and allow for data amortization.

In at least one embodiment, a target utilization point or TUP can be determined for each individual resource that is consumed or used in connection with recording an entry in the log for an operation or command. The TUP for a particular resource can be expressed as a percentage denoting a difference between 100% and an adaptation reserve or AR. The AR for a corresponding resource denotes an amount of the resource reserved for use or consumption when adapting to workload changes in order to provide sustainability. For a regulation cycle, current virtual utilizations or VUs can be determined for the resources. The resource Rmax having the highest VUmax of all resources is determined. The amount of deviation of VUmax from the TUP corresponding to Rmax can be determined. If the deviation amount is more than a specified threshold, a regulation action can be performed. If the deviation amount indicates that VUmax is more than the TUP, the regulation action can increase the flush rate. If the deviation amount indicates that VUmax is less than the TUP, the regulation action can decrease the flush rate. The regulation action can include varying, such as by increasing or decreasing, a system resource affecting the flush rate of the log. The regulation action can include, for example, varying the number of processing cores or amount of CPU resources dedicated for flushing (e.g., used by the flush workflow processing).

In at least one embodiment, a flush working set (FWS) switch utilization point (FSUP) can be defined for each resource. Multiple FWSs can generally be used in an embodiment in connection with recording information about logged entries in volatile memory. In at least one embodiment, 3 FWSs can be used. One of the FWSs can be designated as active for recording information for logged operations or commands. The remaining FWSs can be frozen where entries of frozen FWS are flushed until empty. The currently active FWS can be switched or swapped with a frozen FWS which has been completely flushed responsive to determining that, for the currently active FWS, the current utilization of at least one resource exceeds its corresponding FSUP. Switching the currently active FWS includes transitioning the currently active FWS from active to frozen so that the FWS can be flushed. Switching can also include transitioning a second FWS, which is frozen and has been completely flushed, to active.

In at least one embodiment, commands or operations recorded in the log can include write I/O operations, such as from a host, which writes content to a target location or address, such as a target logical address of a storage object. The storage object can be a logical device, file, or other supported storage object. As another example, commands or operations recorded in the log can include various offload copy methods or commands, such as the XCOPY (Extended Copy) command. Such offload copying commands like XCOPY can be used for data copying between SCSI targets in the same data storage system. The XCOPY command is a SCSI command included in the SCSI standard. Generally, the offload copy operation request can be issued by an external data storage system client, such as a host, as well as an internal data storage system client. In at least one embodiment, the offload copy operation or command, such as the XCOPY command noted above, is a request to perform an offload copy operation from a source to a destination or target. The source and the destination of the XCOPY or other offload copy operation can be specified in any suitable manner. For example, in at least one embodiment, the source can identify one or more logical devices or LUNs, and an associated LBA range of each of the one or more LUNs of the source; and the destination can also identify one or more logical devices or LUNs, and an associated LBA range of each of the one or more LUNs of the destination. The particular manner in which the LUNs are identified can vary with the particular protocol used to access the LUNs. For example, in at least one embodiment in accordance with the SCSI protocol, a LUN of the source or destination of the XCOPY command can be identified using the world wide name (WWN) used to uniquely identify the LUN at a protocol level identifier across the first and second systems, or more generally across multiple data storage systems. Such an offload copy command like XCOPY requests or instructs the data storage system to generally perform an offload copy command internal within the data storage system because both the source and destination of the copy command are within the same data storage system. Generally, the client, such as the host, requests using the XCOPY command that the data storage system manage the copying of the data from the source to the destination. The source and destination of the XCOPY command refer to storage objects, such as block-based addresses of logical devices, volumes, or LUNs, typically in the same system. For example, the source may be a location or logical address on a source device denoting a source LUN of the data storage system that received the XCOPY command. The destination or target of the XCOPY command may be a location or logical address on a target device that is also a logical device denoting the destination or target LUN of the data storage system that received the XCOPY command. The UNMAP command can be used to unmap and thus reclaim space or physical storage associated with specified logical addresses.

In at least one embodiment in accordance with the techniques of the present disclosure, a flush regulator can generally regulate and/or adjust the rate of flushing of the log. The flush regulator can consider a variety of factors in connection with regulating the flushing rate of the log. Recording an entry in the log for a an I/O or other command can generally result in allocation and utilization of many different resources that can vary with the type of I/O or command. Thus, the flush regulator can consider the various resources that can be allocated. For example, consistent with other discussion herein, such resources can include non-volatile memory resources, such as persistently stored PBs and PDESCs (e.g., storage of PDESC ring 912 and PB pool 914 of FIG. 11), as well as volatile memory resources, such as FWS memory objects and structures such as LCs (e.g., LC structures 812, 814 of FIG. 9), LHT buckets (e.g., LHT structure 806*a* and structures 808*a-m*2 of FIG. 9), extent objects, volatile memory copies of PDESCs (e.g. 820*a-b* of FIGS. 9, 10 and 11), and the like. Extent objects can include, for example, memory objects used to describe associated I/O commands such as Xcopy and Unmap commands where the memory objects can be used to describe target logical address ranges.

As another factor, the flush regulator can consider the fact that the amount and allocation rate of each of the different various resources can vary dynamically over time with current workload characteristics. For example, recording a write I/O in the log can include allocating a PDESC and a PB while recording an I/O command such as for an Xcopy or Unmap command may include allocating a PDESC without any PB.

As another factor, the flush regulator can consider that the various resources have various mechanisms and granularities for resource reclamation. As a result, the flush regulator can use different policies for reclamation of each of the various resources. For example, PBs can be stored in a pool-based structure where PBs can be reclaimed for reuse immediately after the stored data in the PB has been flushed. In contrast, PDESCs can be stored in a ring structure (e.g., as in FIG. 6) and can be reclaimed when an entire FWS is fully destaged. As another example, LC structures can be reclaimed when flushing has completed for all PDESCs of the LC.

As another factor, the flush regulator can consider balancing the rate of reclamation of resources and the flush rate with the workload and demand or need for allocation of resources in order to improve resource utilization. Generally, having a shortage of one or more needed resources can be undesirable resulting in inability to service any writes, I/Os or other commands recorded in the log. In such a case, the resource shortage can result from insufficient and untimely resource reclamation due to insufficient flush rate. In contrast, having an excessively high flush rate can reduce the risk of resource shortages but can result in reduced data amortization, and non-optimal utilization of resources.

As yet another factor, the flush regulator can provide for improved utilization of resources in order to adapt to the workload without triggering I/O throttling.

In at least one embodiment of the techniques of the present disclosure, the flush regulator can provide for reliable, smooth flushing as well as improved and/or optimal resource utilization and data amortization. Data amortization can include, for example, flushing several logged writes to the same logical address range or same logical address as an aggregated operation for efficiency of operation. The techniques can provide a smooth flush pace that guarantees sufficient resources for recording the writes and other operations or commands in the log.

In at least one embodiment, flush regulation can operate in accordance with following principles:

1. The flush rate can vary in accordance with, and can track or follow, the I/O ingest rate. (This principle provides smoothness and steadiness).

2. Use of optimal and independent Target Utilization Points (TUP) for each resource (This principle guarantees best possible amortization).

3. Regulation actions are generally a function of current deviation from TUP of the most utilized resource. (This principle provides implementation of the principle 1, and guarantees flush sufficiency in any scenario).

4. FWS switch point regulation (e.g., when active FWS is switched out and frozen) based on each resource utilization per FWS. (This principle guarantees sufficiency of ring-based and other resources reclaimed with a relatively large reclamation granularity without resulting in I/O throttling).

5. The foregoing principles 1-4 are completely independent and can be implemented and applied separately. (This principle makes flush regulation simple, predictable and reliable).

Regulation actions can include one or more actions which result in increasing or decreasing the flush rate at which recorded operations in entries of the log are flushed.

In connection with principle 3 noted above in at least one embodiment, a regulation action can be performed responsive to determining that the most utilized resource has a current utilization deviating from the TUP of that resource, where the amount of deviation exceeds a specified tolerance, threshold or limit. In at least one embodiment, the current utilization can be a virtual utilization or VU with respect to a resource Rn. Virtual utilization is discussed in more detail below.

In connection with principle 4 noted above, the FWS switch point regulation can be based on current resource utilization of each resource by the active FWS. The currently active FWS1 can be switched with another FWS2, where FWS1 transitions from the active state to the frozen state, and where FWS2 transitions from an inactive or idle state (flushing of frozen FWS2 is complete) to the active state. In at least one embodiment, a current resource utilization for an active FWS can be based on a count or other measurement regarding the amount of each resource consumed or used in connection with that particular active FWS instance.

The above-noted principles and associated implementation in at least one embodiment of the techniques of the present disclosure are described in more detail below.

Further detail will now be described in connection with principle 1 regarding the flush rate varying in accordance with, and tracking or following, the ingest rate of operations or commands recorded in the log. In at least one embodiment, the operations or commands recorded in the log can include write I/Os which can vary in payload size (e.g., vary in terms of the amount of data written). Thus, write I/Os of different sizes can consume a PDESC and also varying amounts of PBs used to store the write data written by the write I/Os. In at least one embodiment, the operations or commands recorded in the log can include offload copy operations or commands, such as Xcopy, and can also include Unmap commands. Such offload copy operations such as Xcopy and also the Unmap commands may not consume any PBs and may consume a PDESC. Thus, since each I/O or operation received and recorded in the log can have different characteristics (e.g., type of command or I/O, size or data payload of command or I/O) and can result in consuming different amounts of different resources for recording in the log, the instrumental metric(s) used to characterize the I/O or command ingest rate with respect to operations or commands recorded in the log can be based on a vector of allocation rates for the resources associated with each logged command or operation. In particular, the vector of allocation rates can include an entry or rate for each resource associated with logged commands or operations. For example, if there are 5 resources R1-R5 which can potentially be consumed when logging a command or operation to the log as part of the I/O path, the vector can include 5 allocation rates, one for each of R1-R5. Each allocation rate can be expressed in terms of a rate of allocation with respect to a unit of time, such as per second or other suitable unit of time. To further illustrate, assume for simplicity that there are 2 resources, PBs and PDESCs. In this case, the vector of allocation rates (also sometimes referred to as the allocation rate vector) includes:

$$(PB \text{ Allocation rate}, PDESC \text{ Allocation rate}) \qquad \text{EQUATION 1A}$$

where:

PB allocation rate denotes the rate at which PBs are allocated such as PBs allocated per second; and PDESC allocation rate denotes the rate at which PDESCs are allocated such as PDESCs allocated per second.

More generally, the vector of allocation rates for resources R1-Rm can be expressed as:

$$(R1 \text{ Allocation rate}, R2 \text{ Allocation rate}, \ldots Rm \text{ Allocation rate}) \qquad \text{EQUATION 1B}$$

where

Rk Allocation rate, $0<k<m+1$, denotes the allocation rate for the corresponding resource Rk.

In this manner, the allocation rate vector can be used to generally characterize the allocation rate of the log which is dependent on the individual per resource allocation rates.

Also in connection with principle 1, a vector of flush rates (also sometimes referred to as the flush rate vector) can be specified in terms of a flush rate for each resource. The flush rate vector can be used to generally characterize the flush rate of the log which is dependent on the individual per resource flush rates. The flush rate of a resource Rn indicates the flush processing rate of Rn where allocated units of Rn are associated with logged commands or operations flushed from the log. For example, if there are 2 resources, PBs and PDESCs, the vector of flush rates includes a flush rate for each resource:

$$(PB \text{ flush rate}, PDESC \text{ flush rate}) \qquad \text{EQUATION 2A}$$

where:

PB flush rate denotes the rate at which PBs are processed or flushed from the log; and PDESC flush rate denotes the rate at which PDESCs are processed or flushed from the log.

More generally, the vector of flush rates for resources R1-Rm can be expressed as:

$$(R1 \text{ flush rate}, R2 \text{ flush rate}, \ldots Rm \text{ flush rate}) \qquad \text{EQUATION 2B}$$

where

Rk flush rate, $0<k<m+1$, denotes the flush processing rate for the corresponding resource Rk.

It should be noted that flushed or processed resources as denoted by the flush rates of resources does not mean that such resources have been reclaimed for reuse. Rather, a resource flush rate for a resource Rn, where Rn is associated with flushed log entries, denotes the rate at which the resource Rn is processed as part of flushing the log entries. Put another way in one aspect, the flush rate for resource Rn can denote the rate at which the resource Rn is processed, freed or deallocated when flushing log entries. However, such processed, freed and deallocated units of resource Rn may not yet be reclaimed and not yet made available for reuse. For example, consider the PDESC resource implemented using a ring buffer or structure such as described in connection with FIG. 6. In this case, PDESCs can be associated with flushed entries of the log but such PDESCs associated with flushed log entries may not yet be reclaimed if the tail pointer has not yet advanced past such PDESC entries of the ring buffer.

With respect to each resource, a virtual utilization or VU can be specified for the resource where VU with respect to a resource Rn can be expressed as:

$$VU(Rn)=\text{count/total} \qquad \text{EQUATION 3}$$

where:

count denotes a number of resource units of Rn which are allocated but not yet flushed. Put another way, count denotes a number of resource units of Rn which are allocated and associated with entries of the log and where such log entries are not yet flushed from the log; and total denotes a total number of resource units of the resource Rn (e.g., total can denote 100% of Rn).

For example, assume that PDESC is the resource and there are a total number of 100 PDESCs in the system. At a point in time, 10 of the 100 PDESCs are allocated or associated with recorded operations in the log which have not yet been flushed. In this case, VU (PDESC)=10/100 or 10%.

What will now be described is further detail in connection with principle 2 regarding optimal and independent Target Utilization Points (TUPs) for the resources, where a single TPU can be specified for each resource.

It should be noted that principle 1 guarantees each resource, generally, has nearly or approximately constant VU for each resource since the number of processed or flushed resource units (associated with flushed log entries) can generally be the same as number of newly allocated units associated with logged but not yet flushed resource units (associated with log entries not yet flushed). However, the desired target utilization point or TUP maintained at steady state for the resource may be a point in the full range of 0-100% of VU for the resource. In at least one embodiment, the optimal TUP for each resource can be defined as:

$$TUP(Rn)=(100\%-\text{Adaptation Reserve}) \qquad \text{EQUATION 4}$$

where

TUP(Rn) denotes the optimal TUP for Rn;

100% denotes the total amount or all of Rn; and

Adaptation Reserve denotes a reserved percentage or amount of Rn.

Generally, the Adaptation Reserve (sometimes denoted as AR) for Rn indicates an amount or percentage of Rn which is reserved for use to provide sustainability and availability of Rn during time periods of workload changes and transitions. For example, the AR of Rn can provide for an amount of Rn available for consumption during a period of increased heavy write I/O workload while waiting for the system to respond with a suitable regulation action to increase the flush rate of the log. In at least one embodiment, AR for Rn can be a percentage such as, for example, 30% and can vary with each particular resource.

As noted above, a particular value for AR can be specified for each individual resource potentially consumed or used as part of recording a command or operation, such as a write I/O, in the log. In at least one embodiment the AR for each resource can be tuned and customized for the particular resource. The value for AR for each resource can be determined using any suitable technique such as, for example, through experimentation with different varying workload conditions in an embodiment.

In at least one embodiment, a TUP can be determined for each resource Rn using EQUATION 4. Collectively, a TUP vector can be specified which includes an entry for each resource, where the entry denotes a TUP for the corresponding resource. For example, for a number of resources R1-Rm, the TUP vector can have "m" entries, where the "$k^{th}$" entry (i.e., $0<k<m+1$) specifies the TUP for the corresponding resource Rk. More formally and consistent with EQUATION 3, the TUP vector can be defined as:

$$(TUP(R1),TUP(R2), \ldots TUP(Rm)) \qquad \text{EQUATION 5}$$

where

TUP (Rk), $0<k<m+1$, denotes the TUP for resource Rk, and where TUP (Rk) can be determined using EQUATION 4.

What will now be described is further detail in connection with principle 3 regarding regulation actions performed. Consistent with other discussion herein in at least one embodiment, regulation actions are generally a function of a current deviation from a TUP for the most utilized resource. In connection with principle 3 in at least one embodiment, current utilization of each resource Rn can be expressed using virtual utilization or VU as in EQUATION 3. In at least one embodiment, the TUPs used for resources can be as included in the TUP vector of EQUATION 5 using optimal TUPs determined using EQUATION 4.

The VUs of the various resources can depend on and vary with the dynamically changing workload and associated workload characteristics. For example, as mentioned elsewhere herein, processing write I/Os to record the write I/Os in the log can consume PDESCs and PBs of the persisted log (e.g., persistent NVRAM storage). In contrast, processing of other commands or operations such as Xcopy and Unmap to record such commands in the log can consume PDESCs of the persistent log and extent objects (e.g., volatile memory objects) but not consume any PBs of the persistent log. Additionally, recording the write I/Os does not result in consuming any of the extent objects consumed in connection with recording the Xcopy and Unmap commands in the log. Thus, the amount of each resource consumed depends on the particular types and quantities of commands or operations received and recorded in the log. Accordingly, the VU of each of the resources can vary with time.

In at least one embodiment, processing can be performed, such as by the flush regulator, to calculate and monitor the current VU of each resource. As an anchor for flush regulation in at least one embodiment, processing can select the particular single resource Rmax which has the highest VU of all resources that can potentially be consumed during processing to record an operation or command in the log. The VU of Rmax can be further analyzed to determine what, if any, regulation action is taken. For example, assume there are 5 resources R1, R2, R3, R4 and R5, where R3 has the largest observed VU=80% of all 5 resources. R3 can have an associated TUP, for example, of 60%. Additionally, R3 can have an associated acceptable deviation threshold of 5%, thereby denoting an acceptable VU utilization range of 55%-65%. Based on the foregoing for R3, if R3's current VU falls in the acceptable VU range, then no regulation action is taken. Otherwise, a regulation action can be taken. In this example, the current VU of R3 is 80% which is outside the acceptable VU range and exceeds the maximum allowable VU of 65%. In response, a regulation action can be performed to increase the flush rate. An example of a regulation action can include varying the amount of CPU or processor resources. In connection with the foregoing example to increase the flush rate, the amount of CPU, processor or CPU cores dedicated for flushing can be increased.

Figure 13:
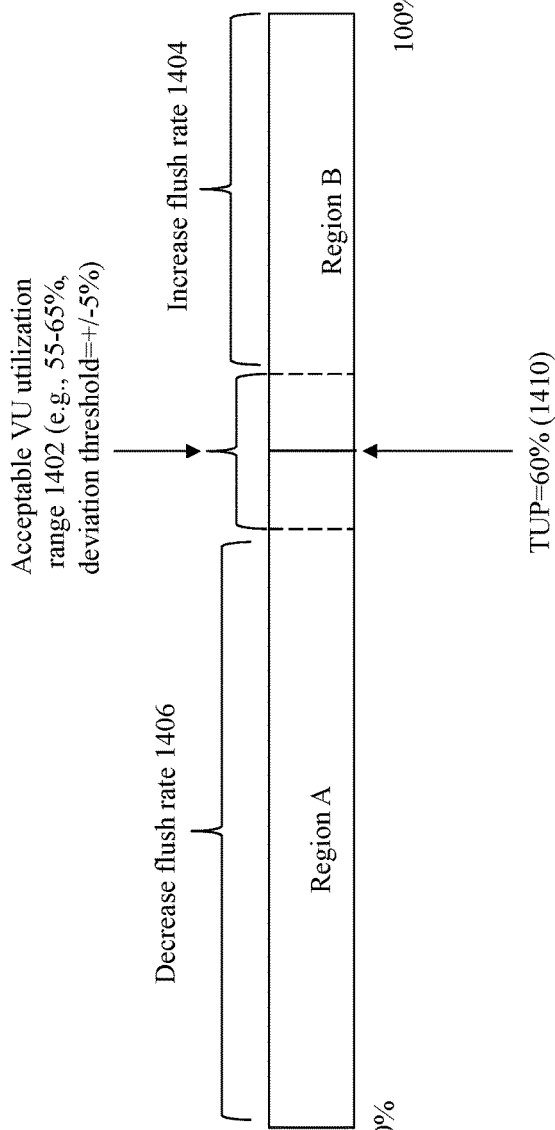
FIG. 13 is an example illustrating virtual utilization ranges for a resource in at least one embodiment in accordance with the techniques of the present disclosure.

To further illustrate the above-noted example with respect to R3, reference is made to the example 1400 of FIG. 13. The example 1400 illustrates a VU range from 0-100%.

Element 1410 denotes the TUP=60% for R3. Element 1402 denotes the acceptable VU utilization range of 55-65% based on an acceptable deviation threshold of +/−5%). If the current VU of R3 falls into the range 1402, no regulation action can be taken. Element 1404 denotes the VU range greater than 65% where, if a current VU of R3 falls into the region B denoted by 1404, a regulation action can be taken to increase the flush rate. Element 1406 denotes the VU range less than 55% where, if a current VU of R3 falls into the region A denoted by 1406, a regulation action can be taken to decrease the flush rate. In connection with the above example, the current VU of R3=80% falls into region B 1404 where, in response, a regulation action can be taken to increase the flush rate.

In connection with performing a regulation action to increase or decrease the flush rate, it should be noted that the flush rate in this context can generally refer to the rate at which entries are flushed from the log. Generally, the regulation action taken can include varying the amount of system resources allocated for use with flushing the log. For example, the regulation action can include increasing or decreasing the amount of CPU resources used for performing processing to flush the log. Responsive to determining to increase the flush rate, the regulation action can include increasing the number of processing cores or processors dedicated to flushing the log. Responsive to determining to decrease the flush rate, the regulation action can include decreasing the number of processing cores or processors dedicated to flushing the log.

Note, that in some instances, a resource may have a relatively low VU and can be typically less than the corresponding TUP of the resource. It can be acceptable for each of one or more resources to have an associated VU that is constantly much less than the corresponding TUP of the resource. For such resources constantly having a very low VU with respect to corresponding TUPs, a manager or administrator of the system can consider performing a regulation action to reduce the total amount of the resource available for use with recording entries in the log for processing received commands and operations. However, care should be taken in connection with reducing the amount of such a resource with a constantly low VU since the resource can actually become a hotspot with a large VU in connection with certain types of workloads. In some cases, a conclusion and recommendation can be made about re-purposing a consistently underutilized resource such as based on per-resource VU statistics. In at least one embodiment, it can be expected that, in a majority of use case scenarios, the most expensive resource can be PB, where PB can have the highest VU used to determine a regulation action.

In at least one embodiment, an assessment or evaluation can be performed periodically based on a defined regulation cycle, for example, such as every half second or other suitable amount of time. In such an embodiment, the assessment can be made periodically (or more generally each regulation cycle) to determine whether to perform a regulation action, and then accordingly perform the regulation action, if needed, based on the assessment. In at least one embodiment, each regulation cycle, processing can be performed with respect to Rmax, the resource with the highest or largest current VU of all the resources. For Rmax, the processing can include calculating the difference or deviation of VU(Rmax) (e.g., where VU(Rmax) can be expressed as in EQUATION 3) from the TUP of Rmax. If the difference or deviation is higher than a specified deviation threshold, a regulation action can be triggered. Generally and with reference to FIG. 13, responsive to VU(Rmax) falling into the range 1404 denoted by region B, the regulation action performed can be expected to increase the flush rate by a specified amount or step. In a similar manner, responsive to VU(Rmax) falling into the range 1406 denoted by region A, the regulation action performed can be expected to decrease the flush rate by a specified amount or step.

In at least one embodiment, a regulation action can generally be implemented by varying (e.g., increasing or decreasing) the amount of one or more system resources available for use with processing performed to flush the log. In at least one embodiment as noted elsewhere herein, the system resource which is varied can be the CPU resource such as varying the number of dedicated processor cores allocated exclusively to flush the log. More generally, an embodiment can also vary the amount of one or more other resources available for the log flushing workflow processing, where the amount of such resources can be expected to affect the flush rate of the log (e.g., rate at which entries are flushed from the log). As another example of a system resource that can be varied with an implemented regulation action, the system resource can be the bandwidth of BE PDs used for storing user data written by recorded write I/Os or other commands which write user data. In at least one embodiment, the total available bandwidth of BE PDs can be partitioned for use by flushing as well as performing other services such as servicing read I/Os. A first amount or portion of the total bandwidth of the BE PDs can be partitioned for use by flushing. To increase the flush rate, the first amount or portion can be increased. To decrease the flush rate, the first amount or portion can be decreased.

In at least one embodiment, performing a regulation action to increase or decrease the amount of a system resource, such as processing cores allocated or dedicated, for flushing the log can generally mean that the amount of the system resource available for other purposes is also varied. For example, there may be a fixed amount F of processor cores available in a system which are allocated and apportioned for use between flushing of the log, ingesting or processing new I/Os, and possibly other workflows. Increasing the number of cores dedicated to flushing the log generally means accordingly reducing the number of cores dedicated for other processing and other workflows such as ingesting or processing new I/Os. Thus, for example, increasing the number of cores dedicated for flushing the log can generally mean reducing the number of processing cores allocated to servicing new I/Os. Thus in at least one embodiment, increasing the number of cores for flushing results in decreasing the number of cores for processing new I/Os. In this manner, increasing the number of cores for flushing can implicitly work as an I/O flow control mechanism to limit or reduce the rate at which new I/Os are processed thereby facilitating reaching an adjusted steady state (i.e., between flushing and ingesting and processing new I/Os).

It should be noted that in some scenarios, an observed flush rate of one or more resources used for recording entries in the log may not increase (e.g., as in EQUATION 2B) despite allocating additional system resources such as allocating additional processing cores or CPU. Even in this case, the techniques of the present disclosure can guarantee reaching some steady point by means of internal flow control (i.e., allocate more cores to flushing results in decreasing the I/O rate even if the flush rate does not increase). In this manner, the system can successfully sustain smoothness in workload. However in such scenarios, a system resource such as the additional processing cores allocated to flushing may not be utilized optimally (e.g., it may be that more CPU resources are allocated for flushing than can be utilized by flushing). In such cases where increasing the number of cores or amount of CPU for flushing does not result in increased flush rate, the additional cores can be alternatively reallocated for other workflows while also reducing the number of cores allocated for use with ingesting and processing new I/Os.

In at least one embodiment, a regulation action can be taken which is expected to increase or decrease one or more of the resource-associated flush rates such as, for example, in EQUATIONS 2A and 2B, where such regulation action can be expected to achieve a target or steady state where the resource-associated flush rates approximate corresponding resource-associated allocation rates (e.g., as in EQUATIONS 1A and 1B). In some embodiments, the current flush rates of the resources observed during regulation cycle N and/or the current allocation rates of resources observed during regulation cycle N can be provided as input into processing at regulation cycle N+1 to determine the effectiveness of a regulation action implemented or effective for regulation cycle N and/or in determining an amount of resource adjustment of change, if any, in regulation cycle N+1. For example, a first regulation action can be implemented or effective for regulation cycle N to increase the flush rate where "X1" additional processor cores or other CPU resource units are dedicated to flushing the log, where X1 is an integer greater than 0. At the end of regulation cycle N, a vector V1 of resource-associated allocation rates and a vector V2 of resource-associated flush rates can be obtained. At the end of regulation cycle N, processing can determine that a second regulation action is needed to further increase the flush rate by an additional amount of X2 processor cores, where X2 is an integer greater than 0, where the second regulation action is implemented or effective in the regulation cycle N+1. The flush regulator can, for example, use V1 and/or V2 to determine how large to make X2. As another input, the flush regulator can examine the deviation or difference between VU of a resource Rn and the corresponding TUP for RN to determine how large to make X2. The flush regulator can also determine the sensitivity or change in observed resource-associated flush rates of one or more resources (from regulation cycle N−1 and cycle N), where such change resulted from the increase X1. In this manner, the flush regulator may determine how to scale X2 to result in a desired small step increase in one or more resource-associated flush rates.

In at least one embodiment, the regulation action performed can be with respect to increasing or decreasing system resources such as CPU or other resources which affect the flushing rate or flush workflow processing.

What will now be described is further detail in connection with principle 4 regarding FWS switch point regulation. In at least one embodiment, an optimal and independent FWS switch utilization point (FSUP) can be defined for each of one or more resources used or consumed in connection with each individual FWS instance. The current active FWS1 can be switched or swapped with another FWS2, where FWS2 is idle and is a frozen FWS that has been completely flushed. After the switch, FWS2 transition to the new active FWS, and FWS1 transitions to a frozen FWS of log entries waiting to be flushed. After the switch, subsequent commands and operations, such as write I/Os, are logged or recorded in FWS2 which is now the active FWS.

In at least one embodiment, processing can be performed to switch the currently active FWS1 with a new active FWS2 when FSUP is reached for any single resource consumed or used in connection with the currently active FWS1. FSUP for a resource Rn, denoted FSUP(Rn), can be defined as:

$$FSUP(Rn) = \frac{(100\% - AR(Rn))}{Y} \qquad \text{EQUATION 6}$$

where:

100% denotes the total amount of Rn available for use or dedicated for use with flushing the log;

AR(Rn) denotes the adaptation reserve or AR of Rn, where AR is described above; and Y denotes a number of FWSs used in an embodiment.

In at least one embodiment such as described in connection with FIG. 12, 3 FWSs can be utilized, where Y=3. FSUP(Rn) of EQUATION 6 is a percentage. However, FSUP can also be expressed as a numeric quantity denoting the number of units of the resource. In particular, it is straightforward to convert FSUP as a percentage to FSUP denoting an equivalent number of resource units. For example, assume the total number of resource units of Rn available for flushing is 1000, where 100% of Rn=1000. If FSUP(Rn) is 30%, then FSUP(Rn)=30%=300 units of Rn.

In at least one embodiment, the resource utilization can be actual or regular utilization (as opposed to VU). A current actual or regular utilization for each resource consumed or used in connection with each particular FWS instance can be based on a count regarding the amount or number of units of each resource consumed or used by the particular FWS. To further illustrate, consider PBs of the non-volatile log storage and PDESCs of the non-volatile log storage. A PB count and a PDESC count can be maintained for each FWS instance. While the FWS is active, each time a new operation or command is recorded in the FWS and a PB is allocated for use in recording the new operation or command in the FWS, the PB count for the FWS can be incremented by 1. While the FWS is active, each time a new operation or command is recorded in the FWS and a PDESC is allocated for use in recording the new operation or command in the FWS, the PDESC count for the FWS can be incremented by 1. In this manner, a set of resource counters can be maintained for each FWS to track the current resource utilizations for the FWS.

The resource utilization UTIL of a resource Rn for a particular FWS instance "j" can be expressed as:

$$UTIL(FWSj, Rn) = \frac{count(FWSj, Rn)}{total\ Rn} \qquad \text{EQUATION 7}$$

where:

UTIL(FWSj, Rn) denotes the resource utilization UTIL of a resource Rn for a particular FWS instance "j";

count(FWSj, Rn) denotes the count or number of resource units consumed or allocated in connection with FWSj; and total Rn denotes 100% or the total number of resources units of Rn dedicated or available for use with flushing the log (e.g., flushing workflow processing).

In at least one embodiment, if the current utilization UTIL(FWSj, Rn) (e.g., EQUATION 7) for any single resource Rn consumed or used in connection with the FWS instance FWSj reaches FSUP (Rn), then FWSj, which is currently the active FWS, is switched or swapped with another FWS2, where FWSj transitions from active to frozen, and FWS2 becomes active. It should be noted that FWS2 can be characterized as idle where FWS2 denotes a frozen FWS which has been completely flushed.

Figure 14:
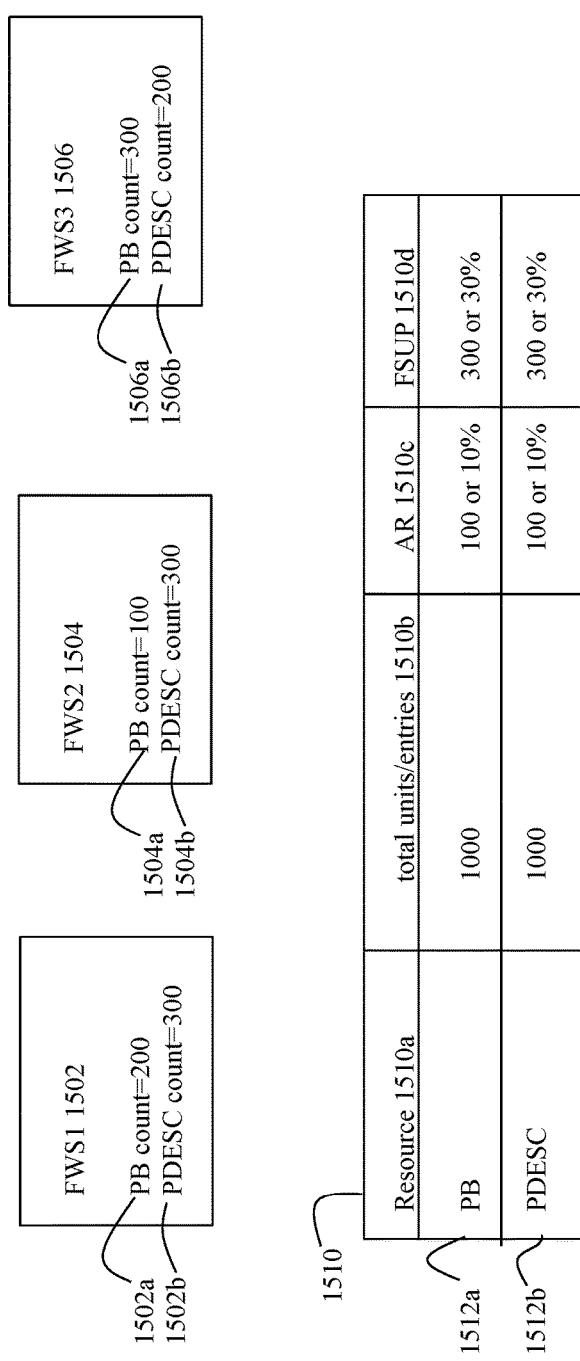
FIG. 14 is an example illustrating counters of flush working sets and a table of per resource information in at least one embodiment in accordance with the techniques of the present disclosure.

To further illustrate, reference is made to the example 1500 of FIG. 14. The example 1500 illustrates sets of resource counters for 3 FWSs. The element 1502 denotes the counters PB count 1502a and PDESC count 1502b for a first FWS1, where the PB count 1502a=200 and the PDESC count 1502b=300. The element 1504 denotes the counters PB count 1504a and PDESC count 1504b for a second FWS2, where the PB count 1504a=100 and the PDESC count 1504b=300. The element 1506 denotes the counters PB count 1506a and PDESC count 1506b for a third FWS3, where the PB count 1506a=300 and the PDESC count 1506b=200.

The table 1510 denotes information of resources consumed, allocated and used in connection with recording entries in the log. The table 1510 includes the following columns: resource 1510a, total units or entries 1510b, AR 1510c and FSUP 1510d. Each row of the table 1510 includes corresponding information for a single resource. The row 1512a indicates that for the PB resource (1510a), 1000 entries or units (1510b) are dedicated for use in connection with recording entries in the log and represent 100% of the PB resource, the PB resource has a corresponding AR=100 or 10% (1510c), and the PB resource has a corresponding FSUP=300 or 30% (1510d). The row 1512b indicates that for the PDESC resource (1510a), 1000 entries or units (1510b) are dedicated for use in connection with recording entries in the log and represent 100% of the PDESC resource, the PDESC resource has a corresponding AR=100 or 10% (1510c), and the PDESC resource has a corresponding FSUP=300 or 30% (1510d). It should be noted that the AR and FSUP for each of the resource can vary although they are the same for PB and PDESC resources for illustration only. The FSUP values in the column 1510d can be determined using EQUATION 6.

In this example 1500, assume that FWS2 1504 and FWS3 1506 are frozen and FWS1 1502 is active. The PDESC count 1502b and the PB count 1502a may have both just been incremented, respectively, to 200 and 300 where processing is performed to evaluate whether either of the counts 1502a-b have reached their corresponding FSUP values as denoted in column 1510d of the table 1510. In particular, processing can be performed to: determine whether PB count 1502a=200 has reached (e.g., is equal to or greater than) FSUP PB, where FSUP PB=300 (e.g., row 1512a column 1510d); and determine whether PDESC count 1502b=300 has reached (e.g., is equal to or greater than) FSUP PDESC, where FSUP PDESC=300 (e.g., row 1512b column 1510d). In this example, processing determines that PDESC count 1502b, having a value of 300, has reached (e.g., is equal to or greater than) FSUP PDESC, which is 300, and triggers switching the currently active FWS1 1502 with another one of the frozen FWSs 1504, 1506, where the another one of the frozen FWSs selected is idle and has been completely flushed. Assume that FWS3 1506 is frozen but still being flushed and that FWS2 1504 is frozen and has been flushed (e.g., FWS2 1504 is idle). In this case, FWS1 1502 can transition from active to frozen, and FWS2 1504 can transition from idle (frozen and flushed) to active, where subsequently received commands or operations, such as write I/Os, can be recorded in FWS2 1504, and FWS1 1502 can be flushed.

As can be seen from the counters 1504a-b, FWS2 1504 was previously switched from active to frozen responsive to determining that the PDESC count 1504b=300 reached the FSUP PDESC=300 (e.g., denoted by row 1512b, column 1510d). Also, as can be seen from the counters 1506a-b, FWS3 1506 was previously switched from active to frozen responsive to determining that the PB count 15041=300 reached the FSUP PB=300 (e.g., denoted by row 1512a, column 1510d).

In some scenarios, the switch point of the currently active FWS can be reached before the oldest frozen FWS has been completely flushed where there is no inactive or idle FWS. For example, assume that processing has determined that the currently active FWS1 1502 should be switched with another FWS that is frozen and has been completely flushed. However, assume in this case that flushing has not completed for either of FWS2 1504 or FWS3 1506, where it is not possible to switch FWS1 1502. In this case, the switch for the currently active FWS1 1502 can be postponed or delayed until there is a frozen FWS which has been completely flushed. During this postponement or delay FWS switching time, the active FWS1 1502 will remain active and can actually fill to consume an amount of one or more resources above FSUP levels. For example, the PDESC count 1502b will continue to be incremented as additional PDESCs are allocated when operations or commands are logged in the FWS1 1502. During the postponement or delay FWS switching time, PDESC resources from the PDESC resource "reserve" are consumed, where the PDESC resource reserve is the amount of the PDESC resource denoted by the AR or adaption reserve amount of 100 for PDESC (e.g., row 1512b, column 1510c).

Figure 15:
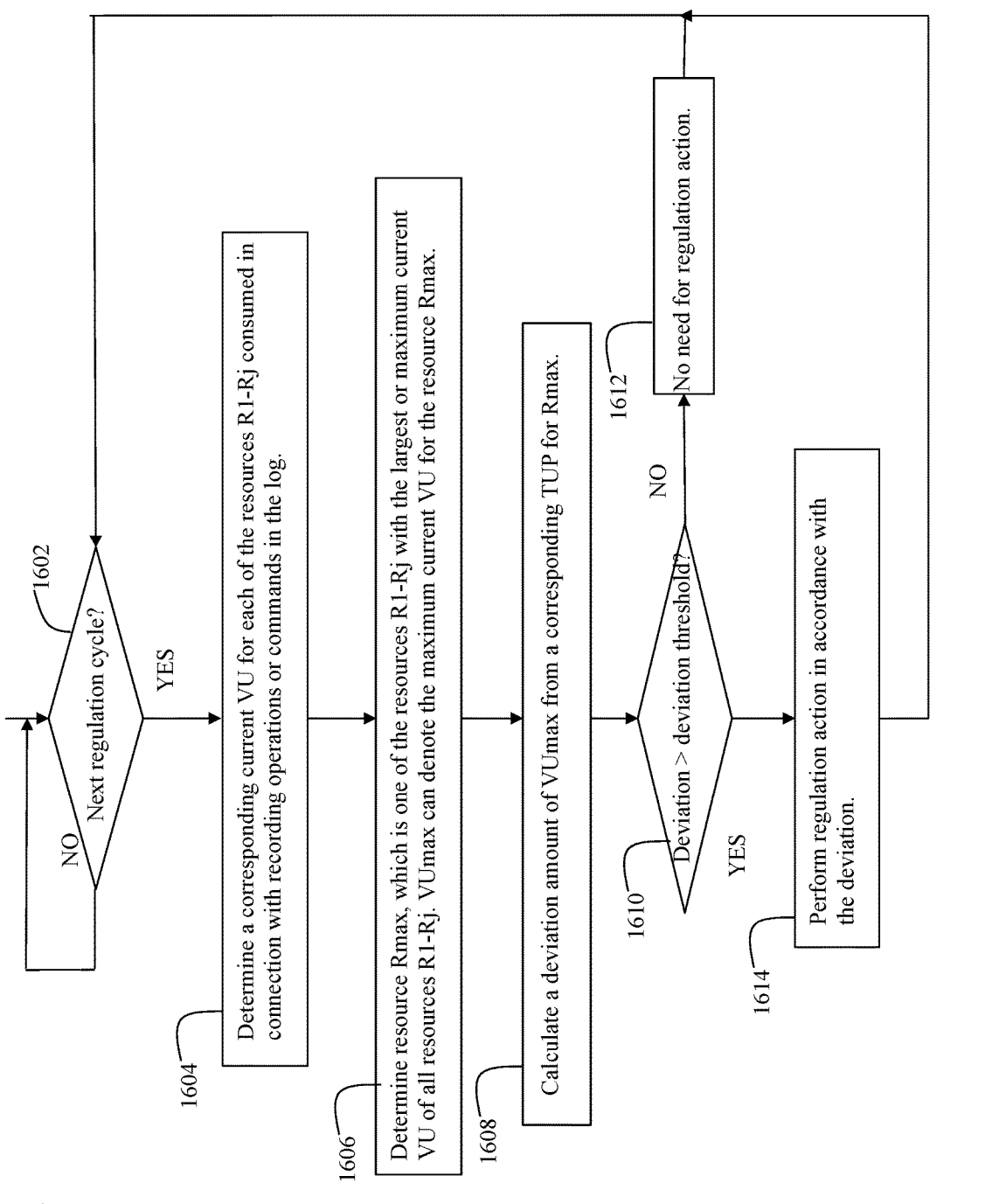

Referring to FIG. 15, shown is a first flowchart 1600 of processing steps that can be performed in at least one embodiment in accordance with the techniques of the present disclosure. The steps of FIG. 15 can be performed, for example, by the flush regulator to determine whether to perform a regulation action. The steps of FIG. 15 summarize processing described above.

At the step 1602, a determination is made as to whether to perform processing for the next regulation cycle. Control remains at the step 1602 until the step 1602 evaluates to yes. Responsive to the step 1602 evaluating to yes control proceeds to the step 1604.

At the step 1604, processing is performed to determine a corresponding current VU for each of the resources R1-Rj consumed in connection with recording operations or commands in the log. From the step 1604, control proceeds to the step 1606.

At the step 1606, processing is performed to determine resource Rmax, which is one of the resources R1-Rj with the largest or maximum current VU of all resources R1-Rj. VUmax can denote the maximum current VU for the resource Rmax. From the step 1606, control proceeds to the step 1608.

At the step 1608, processing is performed to calculate a deviation amount of VUmax from a corresponding TUP for Rmax From the step 1608, control proceeds to the step 1610.

At the step 1610, a determination is made as to whether the deviation amount (determined in the step 1608) is greater than the deviation threshold. If the step 1610 evaluates to no, control proceeds to the step 1612 where no regulation is performed. From the step 1612, control proceeds to the step 1602.

If the step 1610 evaluates to yes, control proceeds to the step 1614. At the step 1614, a regulation action is performed in accordance with the deviation. In particular, if the deviation indicates that VUmax is less than the corresponding TUP for Rmax, a regulation action can be performed to decrease the flush rate. If the deviation indicates that VUmax is more than the corresponding TUP for Rmax, a regulation action can be performed to increase the flush rate. From the step 1614, control proceeds to the step 1602.

As a variation from the steps 1608 and 1610, an embodiment can perform processing as described in connection with FIG. 13. In particular, an acceptable VU utilization range for Rmax can be determined. Processing can then further determine whether VUmax is within the acceptable VU utilization range, or outside of the VU utilization range. If VUmax falls within the acceptable VU range, no regulation action is performed. If VU max falls outside the acceptable VU range and is greater than the upper bound of the acceptable VU range, a regulation action can be taken to increase the flush rate. If VU max falls outside the acceptable VU range and is less than the lower bound of the acceptable VU range, a regulation action can be taken to decrease the flush rate.

Referring to FIG. 16, shown is a second flowchart 1700 of processing steps that can be performed in at least one embodiment in accordance with the techniques of the present disclosure. The steps of FIG. 16 can be performed, for example, by the flush regulator to determine when to switch the currently active FWS out, where the currently active FWS becomes frozen and a second FWS becomes the new active FWS. The steps of FIG. 16 summarize processing described above.

At the step 1702, processing is performed to record an operation or command C1 in the log. Recording the operation or command C1 in the log includes recording information in the currently active FWS1 and also persistently recording information for C1. For example, persistently recording information for a write I/O operation can include persistently recording information in a PDESC-PB pair of non-volatile storage of the log. For example, recording information in the active FWS1 for the write I/O operation can include adding a PDESC to a list of a corresponding LC or bucket in volatile memory. From the step 1702, control proceeds to the step 1704.

At the step 1704, processing can be performed to update resource counters of the active FWS1 based on the units or amount of each resource consumed in connection with recording the operation or command C1 in the log. The resource counters denote the current utilization of the resources in connection with the active FWS. From the step 1704, control proceeds to the step 1706.

At the step 1706, a determination is made as to whether the current utilization of any resource Rn is equal to or greater than the corresponding FSUP for Rn. If the step 1706 evaluates to no, control proceeds to the step 1708 where it is determined that no resource has a current utilization which has reached or exceeds its corresponding FSUP. As a result, FWS switch processing is not performed.

If the step 1706 evaluates to yes, control proceeds to the step 1710 where it is determined that the current utilization of Rn has reached or exceeds its corresponding FSUP (Rn). From the step 1710, control proceeds to the step 1712. At the step 1712, FWS switch processing can be performed to switch active FWS1 with another second FWS. The second FWS was previously frozen and is completely flushed. If there is no such second FWS currently available, delay switching the currently active FWS1 until such a second FWS becomes available. The second FWS becomes available when there is a frozen FWS which has been completely flushed. While delaying and waiting for the second FWS to be completely flushed, operations or commands continue to be recorded in the active FWS1. Once the second FWS is available, FWS switch processing includes transitioning the currently active FWS1 to a frozen state, and transitioning the second FWS to the active state, where subsequent commands or operations can be recorded in the second FWS, the newly active FWS. Frozen FWS1 can be flushed.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:

receiving a plurality of virtual utilizations (VUs) for a plurality of resources consumed in connection with recording entries in a log for commands or operations, wherein each of the plurality of resources has a corresponding VU of the plurality of VUs denoting the VU for said each resource, wherein said corresponding VU denotes a number of allocated units of said each resource which are associated with one or more entries of the log, and wherein the one or more entries have not been flushed from the log;

determining a first of the plurality of resources having a maximum VU of the plurality of VUs;

determining whether the maximum VU is within an acceptable VU range, wherein the acceptable VU range has a lower bound (LB) and an upper bound (UB) determined in accordance with a maximum deviation threshold associated with the first resource;

responsive to determining the maximum VU is not within the acceptable VU range of the first resource, performing one of a plurality of regulation actions that varies an amount of a system resource to accordingly vary a flush rate of entries from the log; and recording a first operation or command in the log, wherein said recording includes recording a first entry regarding the first operation or command in a flush working set (FWS) of entries on volatile storage and persistently recording information, including a corresponding entry regarding the first operation or command, in one or more structures on non-volatile storage.

2. The computer-implemented method of claim 1, wherein responsive to determining the maximum VU is not within the acceptable VU range of the first resource, performing first processing comprising:

determining whether the maximum VU is included in the first VU range of values each exceeding the UB of the acceptable VU range; and responsive to determining the maximum VU is included in the first range of VU values each exceeding the UB of the acceptable VU range, performing a first regulation action, which is expected to increase the flush rate of entries from the log, as the one regulation action.

3. The computer-implemented method of claim 2, the first processing further includes:

determining whether the maximum VU is included in a second VU range of values each less than the LB of the acceptable VU range; and responsive to determining the maximum VU is included in the second range of VU values each less than the LB of the acceptable VU range, performing a second regulation action, which is expected to decrease the flush rate of entries from the log, as the one regulation.

4. The computer-implemented method of claim 3, wherein the first regulation action increases the system resource by a first amount.

5. The computer-implemented method of claim 3, wherein the second regulation action decreases the system resource by a first amount.

6. The computer-implemented method of claim 1, wherein the system resource is a processor resource.

7. The computer-implemented method of claim 6, wherein the regulation action includes varying a number of processing cores dedicated to perform processing to flush entries from the log.

8. The computer-implemented method of claim 1, wherein the plurality of resources includes page descriptors (PDESCs) and page blocks (PBs).

9. The computer-implemented method of claim 8, wherein each PDESC allocated for use in recording a first command or operation in the log describes the first command or operation.

10. The computer-implemented method of claim 9, wherein each of the PBs allocated for use in recording the first command or operation stores data written by the first command or operation, and wherein said each PB is associated with a corresponding allocated PDESC describing the first command or operation.

11. The computer-implemented method of claim 1, wherein the plurality of resources consumed in connection with recording commands or operations in the log include first structures stored in non-volatile storage, and include second structures stored in volatile storage.

12. The computer-implemented method of claim 1, further comprising:

updating a plurality of resource counters of the FWS based on an amount of each of the plurality of resources consumed in connection with recording the first operation or command in the log, wherein the plurality of resource counters denote current utilizations of the plurality of resources for the FWS.

13. The computer-implemented method of claim 12, further comprising:

receiving a plurality of FWS switch utilization points (FSUPs) for the plurality of resources, wherein each of the plurality of resources has a corresponding one of the plurality of FSUPs denoting the FWS switch point for said each resource.

14. The computer-implemented method of claim 13, further comprising:

determining, in accordance with the plurality of resource counters and the plurality of FSUPs, whether a current utilization of a first of the plurality of resources is equal to or greater than the corresponding one of the plurality of FSUPs associated with said first resource; and responsive to determining the current utilization of the first resource is equal to or greater than the corresponding FSUP associated with the first resource, performing first processing to switch the FWS with a second FWS, wherein said first processing transitions the FWS from an active state to a frozen state, and transitions the second FWS from an idle state to an active state, wherein the idle state indicates that the second FWS was previously frozen and all flushing is complete for all recorded entries in the second FWS.

15. The computer-implemented method of claim 14, further comprising:

determining the second FWS is not yet available wherein the second FWS is frozen but has not yet been completely flushed; and responsive to determining the second FWS is not yet available, waiting until the second FWS is available with flushing complete for all entries of the second FWS.

16. The computer-implemented method of claim 15, wherein during said waiting, received commands or operations are recorded in the FWS.

17. The computer-implemented method of claim 1, wherein the commands or operations recorded in the log include a write I/O operation that writes content to a target logical address and include an offload copy operation.

18. A system comprising: one or more processors; and a memory comprising code stored thereon that, when executed, performs a method comprising:

receiving a plurality of virtual utilizations (VUs) for a plurality of resources consumed in connection with recording entries in a log for commands or operations, wherein each of the plurality of resources has a corresponding VU of the plurality of VUs denoting the VU for said each resource, wherein said corresponding VU denotes a number of allocated units of said each resource which are associated with one or more entries of the log, and wherein the one or more entries have not been flushed from the log;

determining a first of the plurality of resources having a maximum VU of the plurality of VUs;

determining whether the maximum VU is within an acceptable VU range, wherein the acceptable VU range has a lower bound (LB) and an upper bound (UB) determined in accordance with a maximum deviation threshold associated with the first resource;

responsive to determining the maximum VU is not within the acceptable VU range of the first resource, performing one of a plurality of regulation actions that varies an amount of a system resource to accordingly vary a flush rate of entries from the log; and recording a first operation or command in the log, wherein said recording includes recording a first entry regarding the first operation or command in a flush working set (FWS) of entries on volatile storage and persistently recording information, including a corresponding entry regarding the first operation or command, in one or more structures on non-volatile storage.

19. A non-transitory computer readable medium comprising code stored thereon that, when executed, performs a method of comprising:

receiving a plurality of virtual utilizations (VUs) for a plurality of resources consumed in connection with recording entries in a log for commands or operations, wherein each of the plurality of resources has a corresponding VU of the plurality of VUs denoting the VU for said each resource, wherein said corresponding VU denotes a number of allocated units of said each resource which are associated with one or more entries of the log, and wherein the one or more entries have not been flushed from the log;

determining a first of the plurality of resources having a maximum VU of the plurality of VUs;

determining whether the maximum VU is within an acceptable VU range, wherein the acceptable VU range has a lower bound (LB) and an upper bound (UB) determined in accordance with a maximum deviation threshold associated with the first resource;

responsive to determining the maximum VU is not within the acceptable VU range of the first resource, changing an amount of processing resources from a first amount of processing resources to a second amount of processing resources that is different from the first amount of processing resources to accordingly vary a flush rate of entries from the log; and recording a first operation or command in the log, wherein said recording includes recording a first entry regarding the first operation or command in a flush working set (FWS) of entries on volatile storage and persistently recording information, including a corresponding entry regarding the first operation or command, in one or more structures on non-volatile storage.

20. The system of claim 18, wherein responsive to determining the maximum VU is not within the acceptable VU range of the first resource, performing first processing comprising:

determining whether the maximum VU is included in the first VU range of values each exceeding the UB of the acceptable VU range; and responsive to determining the maximum VU is included in the first range of VU values each exceeding the UB of the acceptable VU range, performing a first regulation action, which is expected to increase the flush rate of entries from the log, as the one regulation action.

* * * * *